US009508177B2

(12) United States Patent
Kawakami et al.

(10) Patent No.: US 9,508,177 B2
(45) Date of Patent: Nov. 29, 2016

(54) METHOD OF CONTROLLING SKELETON MODEL, AND RECORDING MEDIUM THEREWITH

(71) Applicants: CELSYS, Inc., Tokyo (JP); ELYSIUM CO., LTD., Shizuoka (JP)

(72) Inventors: Yosuke Kawakami, Tokyo (JP); Kentaro Yamaguchi, Tokyo (JP); Takashi Yamaga, Shizuoka (JP)

(73) Assignees: CELSYS, Inc., Tokyo (JP); ELYSIUM CO., LTD., Shizuoka (JP)

(*) Notice: Subject to any disclaimer, the term of this patent is extended or adjusted under 35 U.S.C. 154(b) by 346 days.

(21) Appl. No.: 13/693,287

(22) Filed: Dec. 4, 2012

(65) Prior Publication Data

US 2013/0141431 A1   Jun. 6, 2013

(30) Foreign Application Priority Data

Dec. 6, 2011   (JP) ................................ 2011-266383

(51) Int. Cl.
*G06T 13/40* (2011.01)
(52) U.S. Cl.
CPC .................................... *G06T 13/40* (2013.01)
(58) Field of Classification Search
CPC .................................................... G06T 13/40
See application file for complete search history.

(56) References Cited

U.S. PATENT DOCUMENTS

| | | | |
|---|---|---|---|
| 6,577,315 B1* | 6/2003 | Kroitor | .................... 345/473 |
| 2008/0222555 A1* | 9/2008 | Coyne | .................... 715/781 |
| 2009/0262118 A1* | 10/2009 | Arikan | .............. G06T 13/40 |
| | | | 345/473 |
| 2010/0182329 A1 | 7/2010 | Yamaguchi et al. | |

FOREIGN PATENT DOCUMENTS

| | | |
|---|---|---|
| JP | 2000-306116 | 11/2000 |
| JP | 2009-070340 | 4/2009 |
| JP | 2010-170279 | 8/2010 |
| JP | 2012-164162 | 8/2012 |
| JP | 2012-164221 | 8/2012 |

OTHER PUBLICATIONS

Japanese Office Action mailed Nov. 26, 2013.
Autodesk Maya Visual Reference, Japan, Works Corporation Inc., Mar. 20, 2006, First Edition, p. 137, 157, 177.

* cited by examiner

*Primary Examiner* — Michelle Chin
(74) *Attorney, Agent, or Firm* — IPUSA, PLLC

(57) ABSTRACT

A method of controlling a model by a computer, includes accepting an instruction of changing a pose or a movement of a standard model for which control data for joint angles is attached; determining a pose or a movement of the standard model based on the instruction and the control data for joint angles; and determining a pose or a movement of a target model to be controlled where parts of the standard model and parts of the target model being in correspondence with each other, such that the pose or the movement of the target model follows the pose or the movement of the determined standard model based on the correspondence of the parts of the standard model and the parts of the target model.

18 Claims, 22 Drawing Sheets

FIG.14
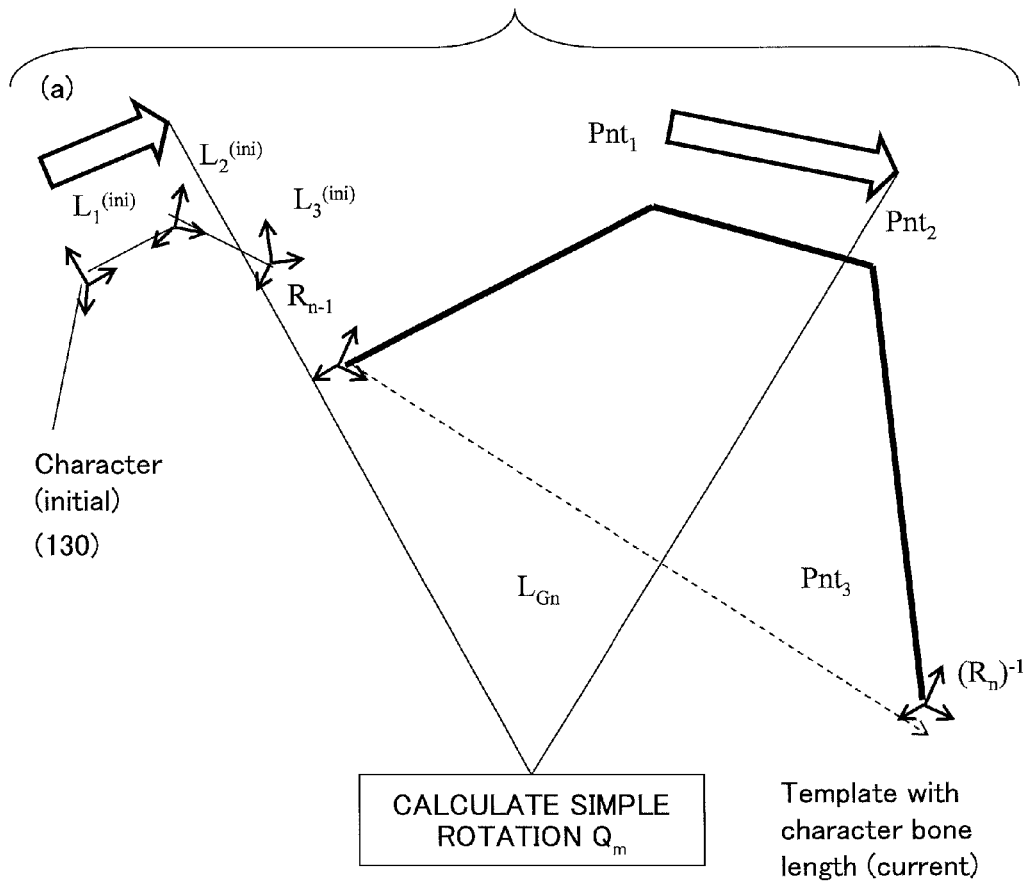
(a)
Character (initial) (130)
CALCULATE SIMPLE ROTATION $Q_m$
Template with character bone length (current)
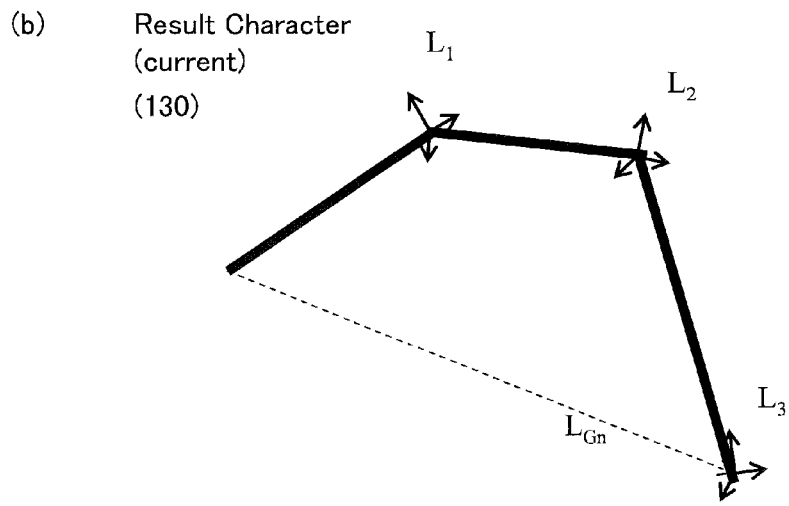
(b) Result Character (current) (130)

FIG.18
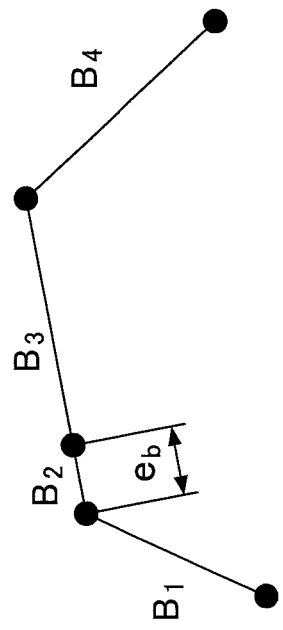
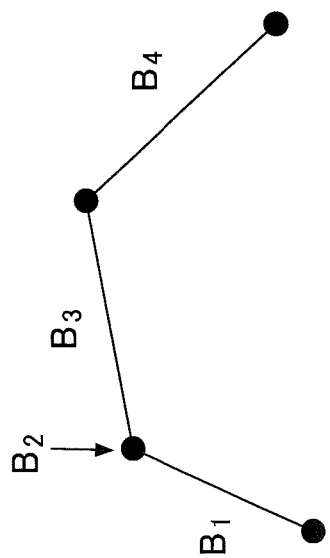

METHOD OF CONTROLLING SKELETON MODEL, AND RECORDING MEDIUM THEREWITH

BACKGROUND OF THE INVENTION

1. Field of the Invention

The present invention relates a method of controlling a model.

2. Description of the Related Art

When designing a pose or animation by moving a CG character or the like, a skeleton model in which plural bones are connected by joints is used.

FIG. 1A is a view showing an example of such a skeleton model 100. The skeleton model 100 includes a first bone 110 (a parent bone or a parent node), a second bone 112 (a child bone or a child node) connected to the first bone 110 via a joint 114, for example.

The skeleton model 100 can be expressed by nodes connected in a parent-child relationship as shown in FIG. 1A. The bone is a line segment connecting the origins of the nodes in the parent-child relationship, or the node itself.

A status of rotation of the joint 114 (bending, torsion) can be expressed by a direction of the second bone 112 (child node) with respect to the first bone 110 (parent node). In order to express the direction of the node, a coordinate system is defined for each of the nodes.

Such a skeleton model may be used not only in a virtual space but also in a real space for controlling a target such as a robot or the like. For such a skeleton model which is used when controlling a posture (pose, movement or the like) of a human body model, an animal model, a fabric or the like on a three dimension (3D) virtual space or a real space, it is necessary to control a position, an angle, rotation (bending, torsion) or the like of each of the bones and joints to not be unnatural. As shown in FIG. 1A, in the skeleton model 100, the bones are connected by the joints so that the movement of each of the bones influences the movement of another bone.

For example, the skeleton model 100 shown in FIG. 1A is a skeleton model of a human body. Thus, there should be a limitation in the movement of an arm with respect to an elbow. If the skeleton model 100 takes a pose in which the arm of the skeleton model 100 is bent with an angle beyond this limitation, the skeleton model 100 becomes unnatural far from an actual human body. Thus, in order to form a skeleton model which takes a natural pose like a human body, it is necessary to set a certain limitation to the movement of a bone corresponding to an arm with respect to a joint corresponding to an elbow.

Patent Document 1 discloses a skeleton model in which a direction of a child bone with respect to a parent bone is expressed by rotation angles around three axes (x, y, z), respectively, in a coordinate system of the parent bone.

In Patent Document 2, a technique is disclosed in which a predetermined point on a spherical surface having a joint as a center is set as a focal point, a surface which is perpendicular to an axis connecting the center and the focal point is set as a projecting surface, and the movable range of the joint is set on the projecting surface.

In Patent Document 3 and Patent Document 4, a technique is disclosed in which a direction of a child bone with respect to a parent bone is corrected, when the direction of the child bone is not within a predetermined movable range, in order to satisfy the condition corresponding to the movable range.

In Patent Document 5, a technique is disclosed in which a calculated amount is reduced by using a monopolar coordinate system when moving a revolute skeleton model at real-time.

In Patent Document 6, a technique is disclosed in which hardness in bending joints of a revolute model is controlled.

However, according to the techniques disclosed in Patent Document 1 to Patent Document 6, when a new skeleton model is generated, it is necessary to set an angle limitation or hardness in bending for each of the joints. This setting is troublesome for users. Further, in order to set the angle limitation or hardness in bending to have the new skeleton model to take a real moving pose, knowledge and experience are required.

Patent Document

[Patent Document 1] Japanese Laid-open Patent Publication No. 2000-306116
[Patent Document 2] Japanese Laid-open Patent Publication No. 2009-070340
[Patent Document 3] Japanese Laid-open Patent Publication No. 2010-170279
[Patent Document 4] US published patent application No. 2010-182329
[Patent Document 5] Japanese Patent Application No. 2011-024449
[Patent Document 6] Japanese Patent Application No. 2011-025361

SUMMARY OF THE INVENTION

The present invention is made in light of the above problems, and provides a method of controlling a posture of a skeleton model capable of reducing a troublesome method of setting angle limitations of a joint, hardness in bending joints or the like.

According to an embodiment, there is provided method of controlling a model by a computer, including: accepting an instruction of changing a pose or a movement of a standard model for which control data for joint angles is attached; determining a pose or a movement of the standard model based on the instruction and the control data for joint angles; and determining a pose or a movement of a target model to be controlled where parts of the standard model and parts of the target model being in correspondence with each other, such that the pose or the movement of the target model follows the pose or the movement of the determined standard model based on the correspondence of the parts of the standard model and the parts of the target model.

According to another embodiment, there is provided a method of determining a pose or a movement of a target model to be controlled including plural groups of bones each group including one or more bones, using a standard model including plurality of groups of bones each including one or more bones, the groups of bones of the standard model and the groups of bones of the target model being in correspondence with each other, including specifying a group of bones of the standard model and a corresponding group of bones of the target model based on the correspondence of the groups of bones of the standard model and the groups of bones of the target model, determining a direction of the specified group of bones of the target model based on the specified group of bones of the standard model; and determining a direction of each of the bones included in the specified group of bones of the target model based on the corresponding bones included in the specified group of bones of the standard model.

Note that also arbitrary combinations of the above-described constituents, and any exchanges of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 14 is a view for explaining an operation of determining a pose of a character;

FIG. 18 is a view showing adjusting a bone axial vector;

DETAILED DESCRIPTION OF THE PREFERRED EMBODIMENTS

Figure 1A:
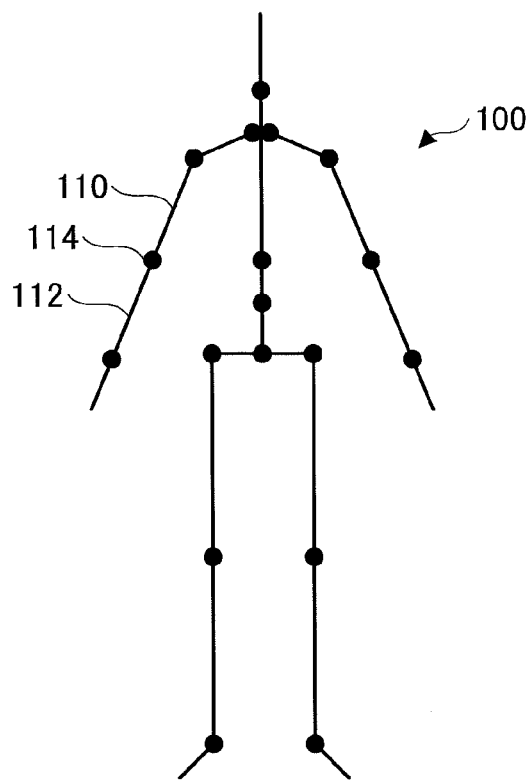
FIG. 1A is a view showing an example of a skeleton model.

The invention will be described herein with reference to illustrative embodiments. Those skilled in the art will recognize that many alternative embodiments can be accomplished using the teachings of the present invention and that the invention is not limited to the embodiment illustrated for explanatory purposes.

It is to be noted that, in the explanation of the drawings, the same components are given the same reference numerals, and explanations are not repeated.

Words used in this embodiment are defined as follows. These words are further explained in detail later.

(1) A "skeleton" means a bone or the like.
(2) A "node" means each portion of a model.
(3) A "bone" means a line segment connecting origins of two nodes which are in a parent-child relationship, or a node itself.
(4) A "bone group" means an assembly of linearly connected one or more bones.
(5) An "object" means a target skeleton model for which a pose or a movement is to be determined.
(6) An "object coordinate system" means a coordinate system of a highest parent node (root node).
(7) A "local coordinate system" is a coordinate system of a parent bone or a parent bone group.
(8) A "template" means a standard skeleton model with control data for joint angles.
(9) A "character" means a skeleton model to be controlled without control data for joint angles.

Other words are explained later.

Figure 2B:
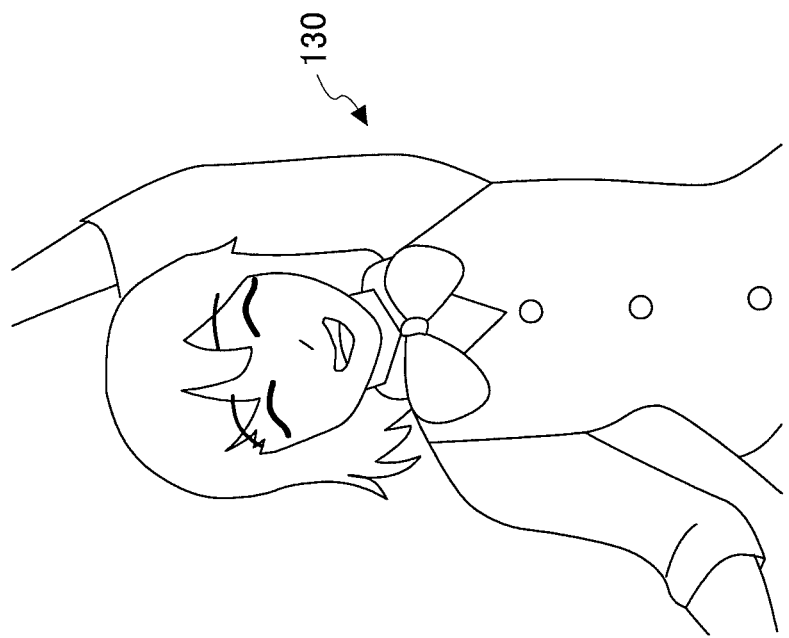
FIG. 2B is a view showing an example of a character.
Figure 2A:
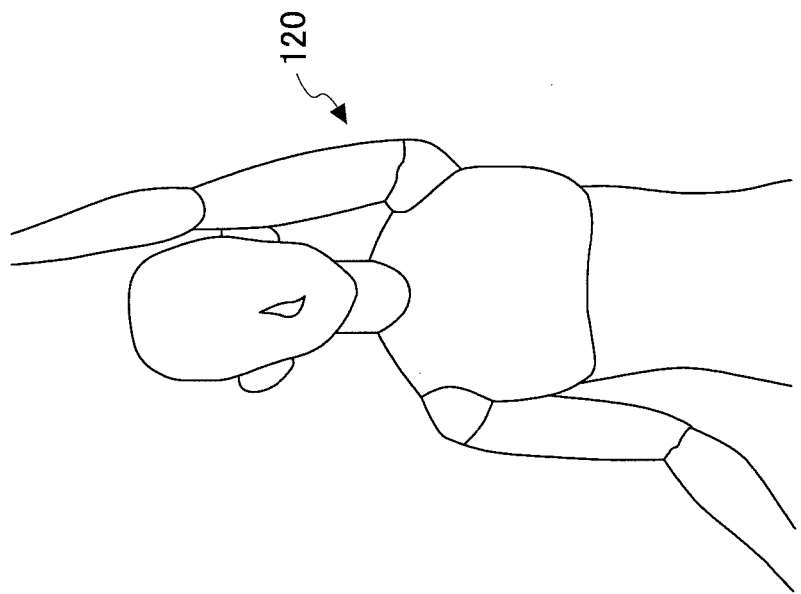
FIG. 2A is a view showing an example of a template.

FIG. 2A is a view showing an example of a template 120. FIG. 2B is a view showing an example of a character 130.

Figure 3:
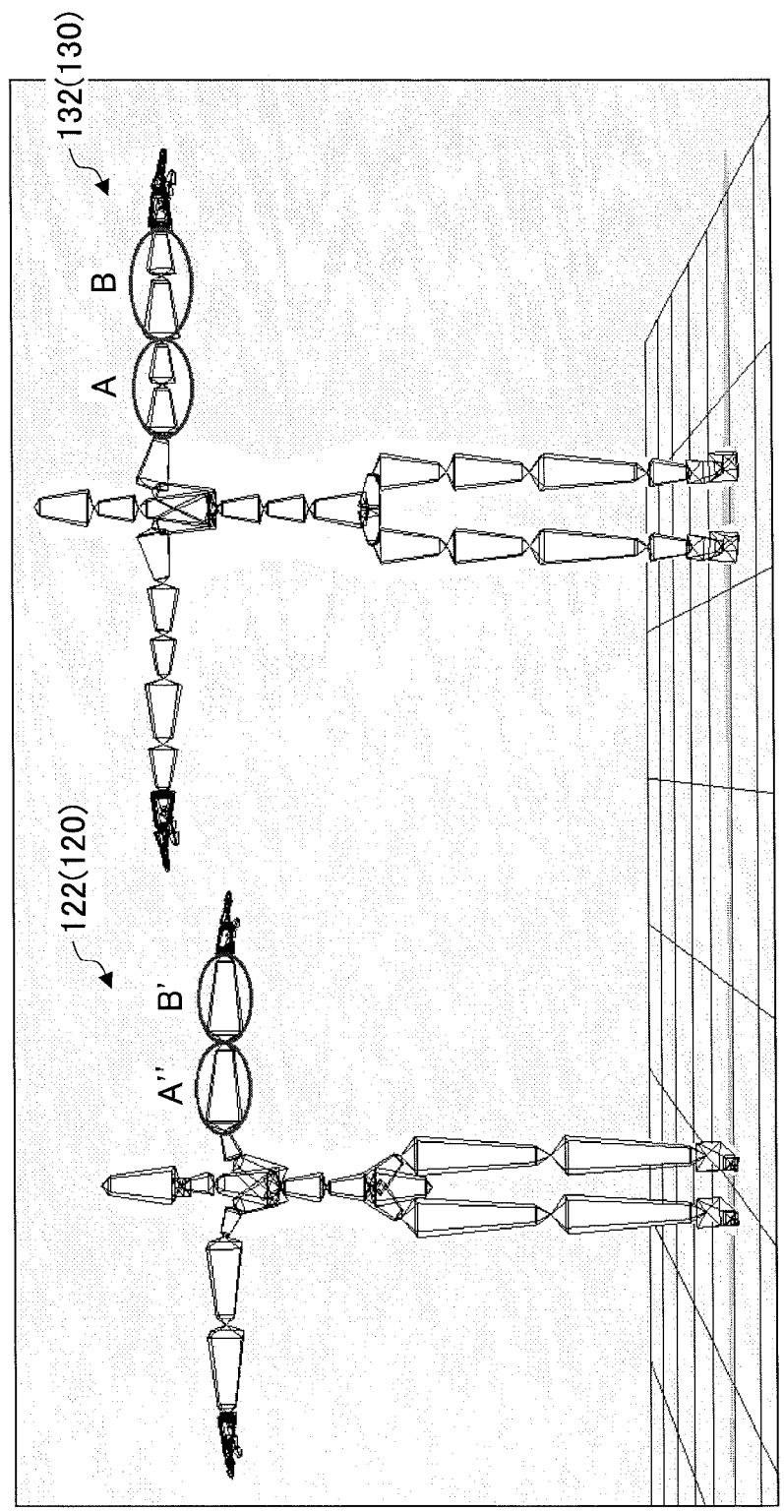
FIG. 3 a view showing an example of coordination of bone groups according to an embodiment.

FIG. 3 is a view showing an example of a standard skeleton model 122 (standard model) and a target skeleton model 132 (target model) to be controlled. The template 120 shown in FIG. 2A includes the standard skeleton model 122, and the character 130 shown in FIG. 2B includes the target skeleton model 132.

In this embodiment, control data for joint angles are not set for the target skeleton model 132 of the character 130.

However, control data for joint angles are previously set for the standard skeleton model 122 of the template 120. The control data for joint angles includes a setting of an angle limitation or hardness in bending for each of the joints.

The standard skeleton model 122 of the template 120 is a previously prepared skeleton model having a function to apply a limitation to a pose or a movement of the character 130 shown in FIG. 2B to restrict an unnatural pose or movement of the character 130.

In this embodiment, in order to change a pose or a movement of the character 130 (FIG. 2B), a pose or a movement of the template 120 (FIG. 2A) is changed first. As the template 120 is provided with the control data for joint angles, the template 120 is controlled not to take an unnatural pose or movement.

Actually, an operator inputs an instruction causing a pose or a movement of the character 130 via a user interface. The instruction is applied to the template 120 shown in FIG. 2A first.

As will be explained later, parts of the template 120 and parts of the character 130 are in correspondence with each other.

Thus, specifically, the instruction of changing the pose or the movement of the character 130 is converted to the instruction of changing the pose or the movement of the target 120 based on the correspondence of the parts of the template 120 and the parts of the character 130. Then, the pose or the movement of the target 120 is determined.

Then, the pose or the movement of the template 120 is copied for the character 130 so that a new pose or movement for the character 130 is displayed.

In the above series of operations, it is not necessary to display the template 120 on a screen. This means that the operator may input the instruction of the pose or the movement just seeing an image of the character 130. With this user interface, the operator can instruct providing a natural pose or movement of the character 130 without recognizing existence of the template 120.

However, the embodiment is not limited so, and the template 120 may also be displayed. Further, a user interface in which the operator can operate the template 120 may be provided.

When the template 120 is displayed, the operator may input an instruction of changing the pose or the movement of the template 120 in order to change the pose or the movement of the character 130 at last.

The standard skeleton model 122 and the target skeleton model 132 include plural bone groups, respectively as shown in FIG. 3. The standard skeleton model 122 includes a bone group A' and a bone group B'. The target skeleton model 132 includes a bone group A and a bone group B. In this embodiment, the bone groups of the target skeleton model 132 are in correspondence with the bone groups of the standard skeleton model 122. Specifically, the bone group A' and bone group B' of the standard skeleton model 122 are in correspondence with the bone group A and bone group B of the target skeleton model 132, respectively.

Even when the numbers of the bones included in the skeleton models are different, the bone groups can be in correspondence with each other.

The bone groups of the standard skeleton model 122 and the target skeleton model 132 may be determined to correspond with each other using a known technique of pattern recognition. Alternatively, the operator may previously designate the correspondence of the bone groups. Further alternatively, the operator may correct the correspondence of the bone groups obtained by the technique of pattern recognition.

Plural of the templates 120 may be prepared. Plural kinds of templates of a human body model, an animal model, a fabric or the like may be prepared. In such a case, the operator may select an appropriate template among the plural templates. Alternatively, an appropriate template may be selected by the known technique of pattern recognition based on the character 130.

As described above, the selection of the template 120 is performed and the correspondence of the bone groups is determined.

Then, the operator inputs an instruction to change the pose or the movement of the character 130 via an appropriate user interface. Upon accepting the instruction, a system, which will be explained later with reference to FIG. 8 and FIG. 22, changes the pose or the movement of the template 120, not the character 130. As described above, the template 120 is provided with the control data for joint angles so that the template 120 does not take the unnatural pose or movement. Then, the system copies the pose or the movement of the template 120 into the character 130. Then, the system displays the pose or the movement of the character 130 with appropriate time intervals.

When the target skeleton model 132 of the character 130 includes a bone group including plural bones, it can be controlled such that the plural bones included in the bone group smoothly move based on the status of the nodes upstream and downstream of the bone group.

Figure 8:
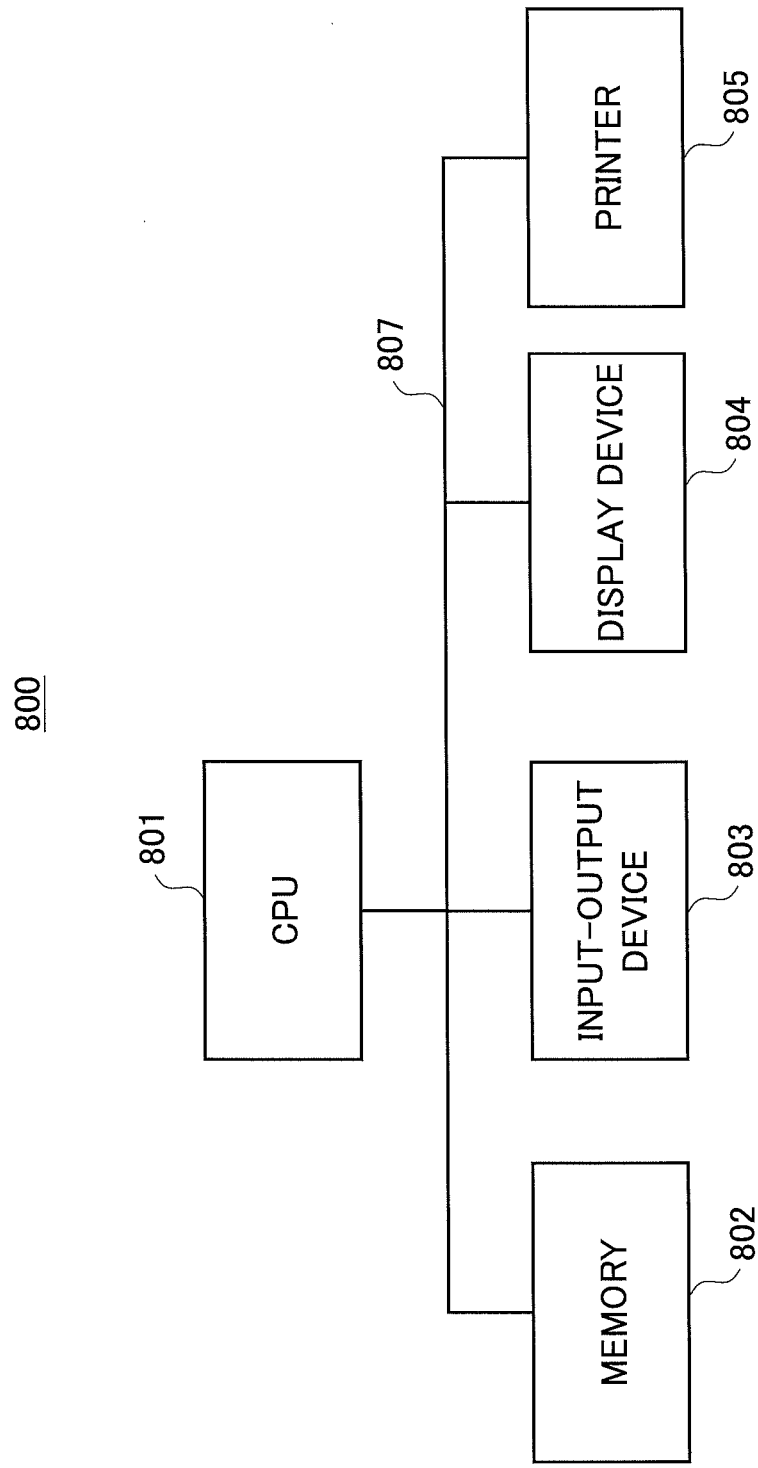
FIG. 8 is a block diagram showing an example of a hardware structure of a model control system.

FIG. 8 is a block diagram showing an example of a hardware structure of a model control system 800.

The model control system 800 includes a CPU 801, a memory 802, an input-output device 803, a display device 804, and a printer 805. The input-output device 803 may be a mouse, a tablet, a touch screen, a keyboard, a scanner or the like.

Figure 22:
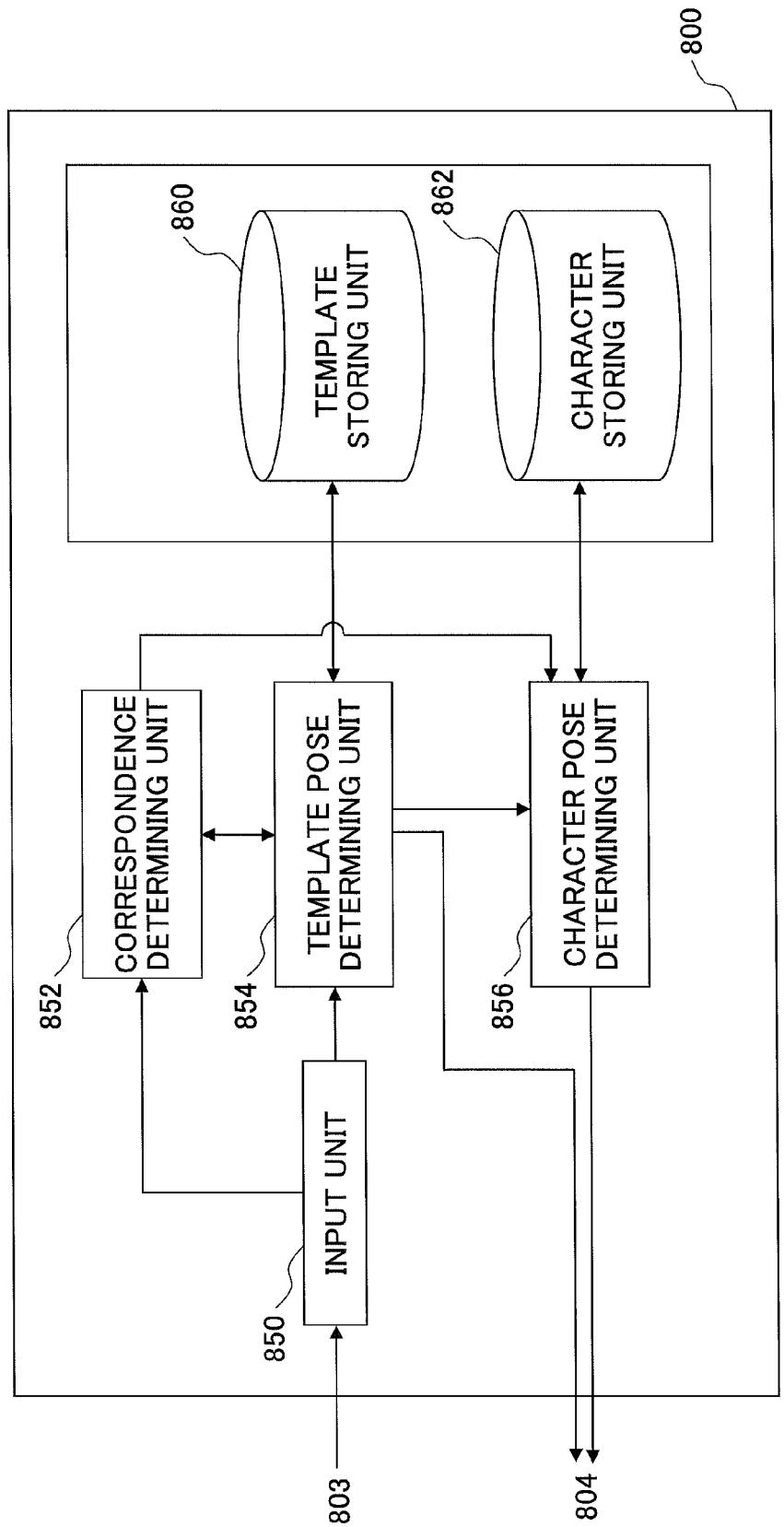
FIG. 22 is a block diagram showing an example of a functional structure of a model control system.

FIG. 22 is a block diagram showing an example of a functional structure of the model control system 800. The memory 802 includes a static memory and a dynamic memory. The model control system 800 may be a computer.

The model control system 800 includes an input unit 850, a correspondence determining unit 852, a template pose determining unit 854, a character pose determining unit 856, a template storing unit 860, and a character storing unit 862.

The template storing unit 860 stores the template 120 (the standard skeleton model 122) with the control data for joint angles. The template storing unit 860 may store plural kinds of templates. The character storing unit 862 stores the character 130 (the target skeleton model 132).

The input unit 850 accepts an instruction from an operator via the input-output device 803. The correspondence determining unit 852 determines the correspondence between the bone groups of the template 120 and the character 130. The determined correspondence may be stored in the character storing unit 862 with the character 130.

The template pose determining unit 854 determines the pose of the template 120 based on the instruction from the operator and the control data for joint angles. When the pose selected to be used by the operator is a natural pose based on the control data for joint angles, the template pose determining unit 854 determines to change the pose of the template 120 as instructed. However, when the pose selected by the operator is an unnatural pose or the like, the template pose determining unit 854 determines not to change the pose of the template 120 and may display an error notice or the like for the operator via the display device 804. In this embodiment, the pose selected by the operator is modified based on the control data for joint angles for the pose of the template 120.

The character pose determining unit 856 determines the pose of the character 130 by copying the pose of the character 120 determined by the template pose determining unit 854. Then, the character 130 with the determined pose is displayed on the display device 804.

(Correspondence of Bone)

First, an operator generates a character and selects a template corresponding to the generated character. It is assumed that the character 130 as shown in FIG. 2B is generated and the template 120 as shown in FIG. 2A is selected.

Bone groups are generated for the template 120 and the character 130. Then, whether the bone groups of the template 120 and the character 130 are in correspondence with each other is determined.

A pair of bone groups of the template 120 and the character 130 is searched as follows, for example.

Figure 4:
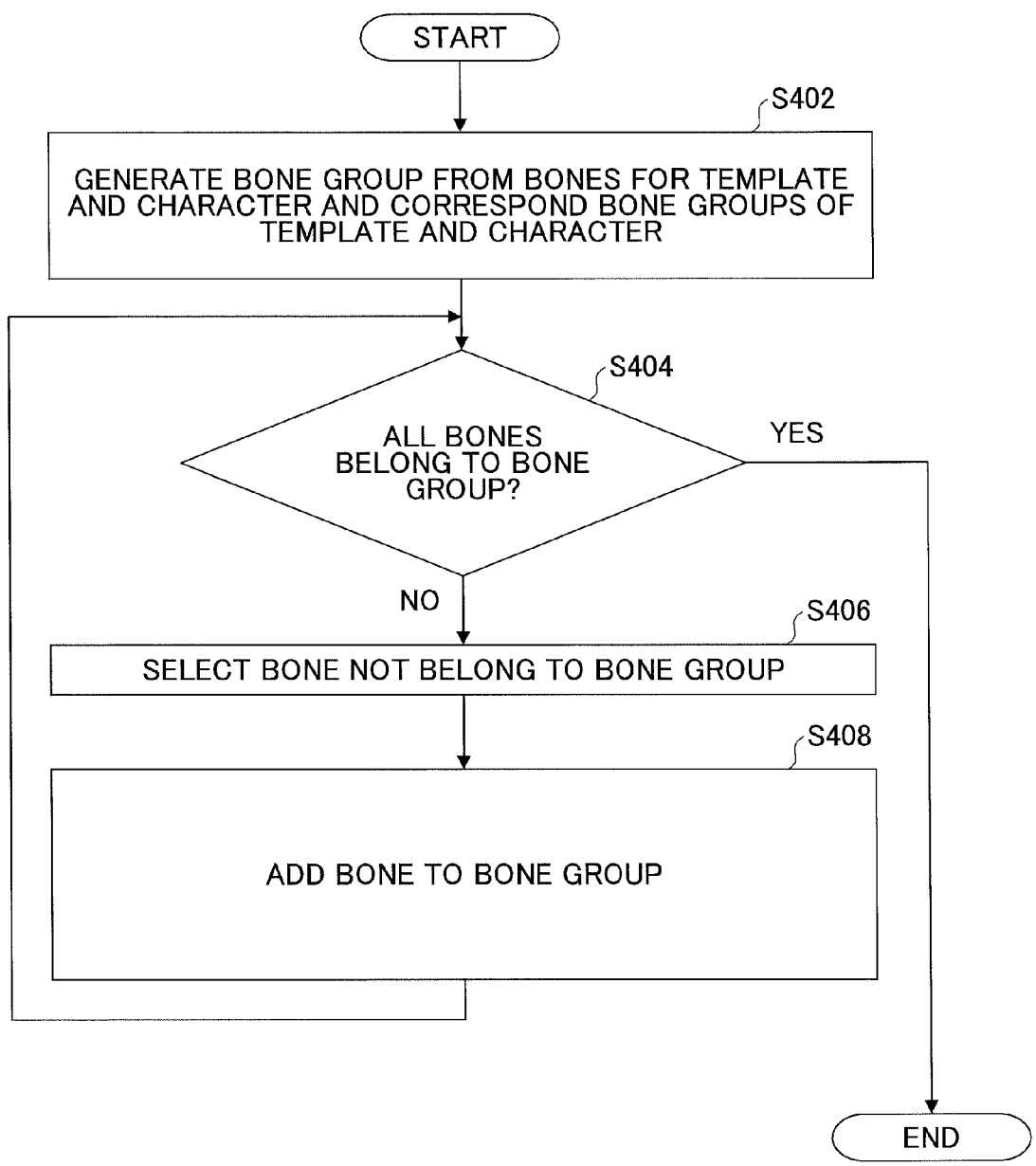
FIG. 4 is a flowchart showing an example of an operation of determining correspondence between bone groups of template and character.

FIG. 4 is a flowchart showing an example of an operation of determining correspondence between bone groups of the template 120 and the character 130. This operation is performed by the correspondence determining unit 852 (see FIG. 22).

In step S402, bones of the template 120 and bones of the character 130 are determined to be in correspondence with each other, respectively, by a known technique of pattern recognition or the like. Then, bone groups are generated from the bones for the template 120 and the character 130, respectively, and the generated bone groups are in correspondence with each other.

In step S404, whether all of the bones of the template 120 and the character 130 belong to the bone groups is determined. When it is determined that all of the bones belong to the bone groups (YES in step S404), the process ends.

When it is determined that not all of the bones belong to the bone groups (NO in step S404), the process proceeds to step S406.

In step S406, one of the bones which does not belong to any of the bone groups is selected.

In step S408, whether the bone groups exist at both sides of the selected bone is determined. When there is a bone group at one side, the selected bone is added to the bone group. When there are bone groups at both sides, the selected bone is added to one of the bone groups. Which of the bone groups is selected to include the bone may be determined by a known technique of pattern recognition. When there are not bone groups at both sides, the selected bone is released. Then, the process moves back to step S404.

By performing the above operation, the bone groups are generated for the template 120 and the character 130 and are in correspondence with each other. The operator may correct the correspondence of the bone groups. Alternatively, the operator may designate the correspondence of the bone groups. The correspondence of the bone groups is not limited to the above embodiment.

(Calculation of Coordinate System by Matrix)

Figure 5:
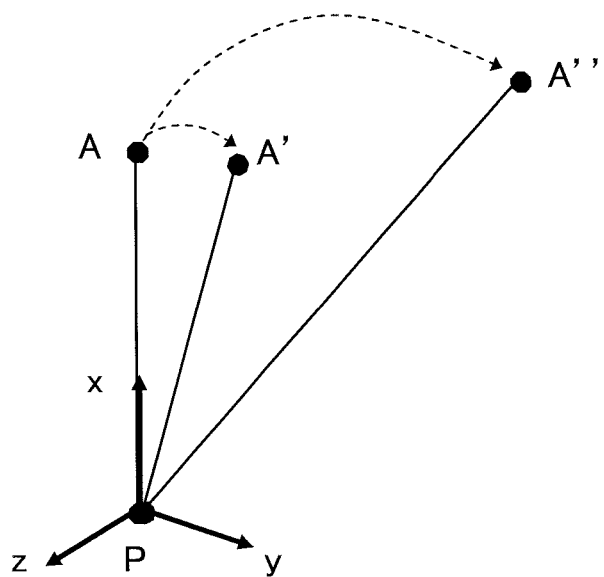
FIG. 5 is a view for explaining a rotation of a bone.

FIG. 5 is a view for explaining a rotation of a bone. In a three dimensional coordinate system xyz, when rotating an end "A" of a bone "PA" while having an origin "P" as a center and keeping the length of the bone "PA" constant to a position "A'", coordinates of the position "A'" ($x_0'$, $y_0'$, $z_0'$) can be expressed as follows using a matrix M. Here, coordinates of the position "A" are ($x_0$, $y_0$, $z_0$).

$$M = \begin{pmatrix} m_{00} & m_{01} & m_{02} \\ m_{10} & m_{11} & m_{12} \\ m_{20} & m_{21} & m_{22} \end{pmatrix}$$ (Equation 1)

$$(x_0', y_0', z_0') =$$

$$(x_0, y_0, z_0)M = (x_0, y_0, z_0) \begin{pmatrix} m_{00} & m_{01} & m_{02} \\ m_{10} & m_{11} & m_{12} \\ m_{20} & m_{21} & m_{22} \end{pmatrix}$$

Figure 1B:
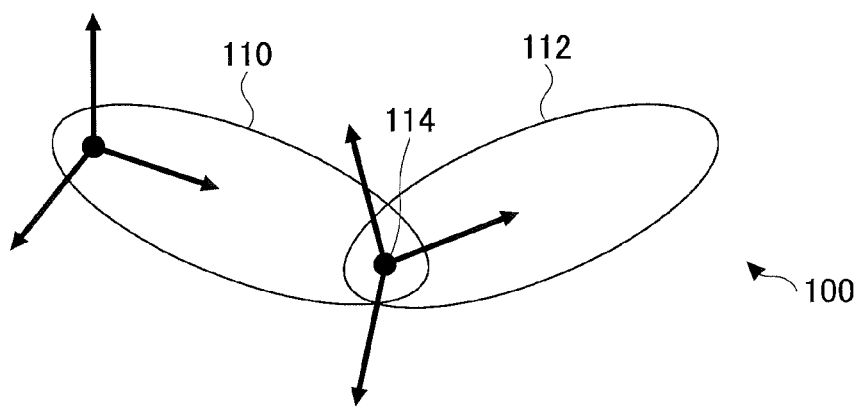
FIG. 1B is a view showing an example of a part of the skeleton model.

Although rotation of a bone is exemplified in the above example, a relative relationship between two coordinate systems can be expressed by the matrix M. Further, each of the bones may have a unique coordinate system. In this embodiment, it is assumed that each of the bones has an individual (unique) coordinate system (see FIG. 1B).

For example, by obtaining a matrix Ma which converts unit vectors in x-axis, y-axis, and z-axis directions of a coordinate system of a bone to unit vectors in x-axis, y-axis, and z-axis directions of a coordinate system of another bone, the matrix Ma can express a relative relationship between these coordinate systems. In this embodiment, the matrix Ma is referred to as a "coordinate conversion matrix".

Further, when rotating the end "A" of the bone "PA" while having the origin "P" as a center and changing the length of the bone "PA" to be longer to a position "A''", coordinates of the position "A''" ($x_0''$, $y_0''$, $z_0''$) can be expressed as follows using a matrix Mt.

$$Mt = \begin{pmatrix} m_{00} & m_{01} & m_{02} & 0 \\ m_{10} & m_{11} & m_{12} & 0 \\ m_{20} & m_{21} & m_{22} & 0 \\ a & b & c & 1 \end{pmatrix}$$ [Equation 2]

$$(x_0'', y_0'', z_0'', 1) =$$

$$(x_0, y_0, z_0, 1)Mt = (x_0, y_0, z_0, 1) \begin{pmatrix} m_{00} & m_{01} & m_{02} & 0 \\ m_{10} & m_{11} & m_{12} & 0 \\ m_{20} & m_{21} & m_{22} & 0 \\ a & b & c & 0 \end{pmatrix}$$

Here, a, b, and c in the matrix Mt are referred to as a "trans unit". The trans unit means a movement amount of a bone. When the matrix is a local matrix, the transfer unit expresses a movement amount from a parent, in other words, a length of the bone. On the other hand, "$m_{00}$" to "$m_{22}$" only contribute to rotation of the bone and are referred to as a "rotation unit".

[Copy of Pose]

Copying of the pose is performed on the corresponding bone groups. In this embodiment, two examples are explained about the copying of pose, however, the copying of the pose is not limited solely to these two examples.

(1) Calculation of Coordinate System Adjusting Matrix

Although similar to the coordinate systems of the bones, the coordinate systems of the bone groups for the template 120 and the character 130 are different. Thus, first, a "coordinate system adjusting matrix" that expresses a relationship between the coordinate systems of the bone groups for the template 120 and the character 130 is calculated based on information about the bone group of the character 130 (which will be referred to as a "character bone group") and the bone group of the template 120 (which will be referred to as a "template bone group") at an initial state. This operation is performed once at first.

The method of calculating the coordinate system adjusting matrix is explained with reference to FIG. 6A to FIG. 6C.

(a) Generating Overlapped State

A directed line segment from a starting point to an end point of a bone group is referred to as a "bone group axis". It is necessary to have directions of the bone group axes of the template 120 and the character 130 become the same in order to calculate the coordinate system adjusting matrix.

First, using the template 120 and the character 130 at an initial state, the bone group axis of the character 130 is adjusted to coincide the bone group axis of the template 120.

Figure 6A:
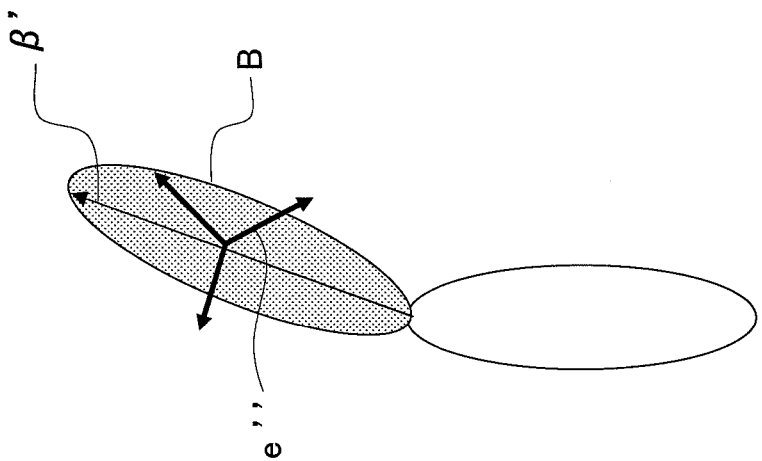
FIG. 6A to FIG. 6C are views for explaining a method of calculating a coordinate system adjusting matrix.
Figure 6B:
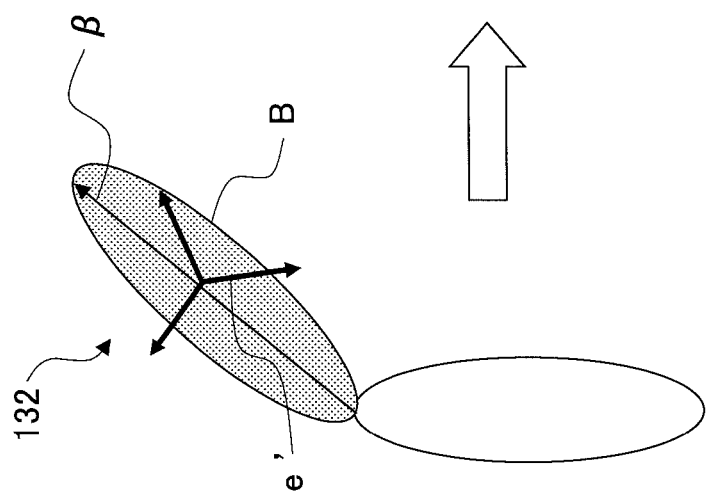

FIG. 6A shows a part of the standard skeleton model 122 of the template 120 and FIG. 6B shows a part of the target skeleton model 132 of the character 130 at the initial state, respectively. The bone group B' shown in FIG. 6A and the bone group B shown in FIG. 6B are in correspondence with each other, in other words, these are a pair. The bone group B' includes a bone group axis α and a coordinate system e. The bone group B includes a bone group axis β and a coordinate system e'.

In this case, first, a matrix M1 for coinciding the direction of the bone group axis β to the direction of the bone group axis α is calculated.

Figure 6C:
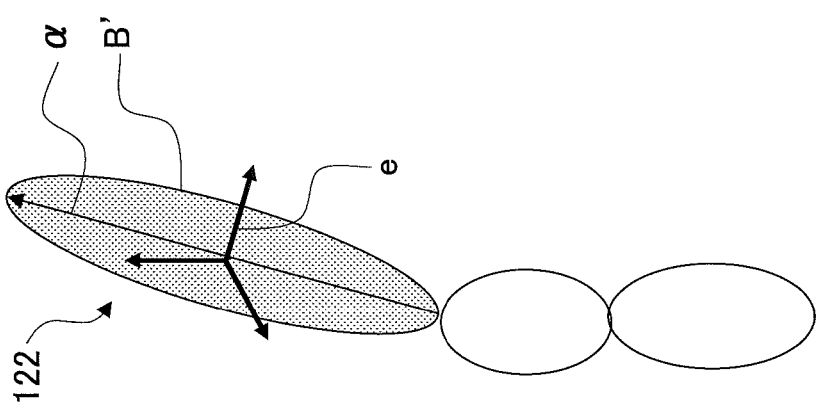

Then, the bone group B of the target skeleton model 132 is actually rotated by using the matrix M1 as shown in FIG. 6C. Here, the bone group B comes to include a bone group axis β' and a coordinate system e'' where the direction of the bone group axis β' coincides the direction of the bone group axis α of the standard skeleton model 122. The bone group B at this state is referred to as in an "overlapped state".

(b) Calculating Coordinate System Adjusting Matrix

Although the directions of the bone group axes of the character 120 at the overlapped state and the template 130 at the initial state coincide with the above operation, the coordinate systems (the coordinate system e and the coordinate system e") of them are different. Thus, a matrix M2, which is the coordinate system adjusting matrix, for adjusting the difference of these coordinate systems is obtained.

The method of obtaining the coordinate system adjusting matrix is explained later in detail.

(2) Designating and Copy Pose or Movement

First, the system 800 accepts a designation from the operator to change the pose or the movement of the character 130.

Then, the model control system 800 changes the pose or the movement of the template 120. This operation is performed by the template pose determining unit 854.

The model control system 800 copies the pose or the movement of the template 120 into that of the character 130. The pose of the character 130 is determined by applying the coordinate system adjusting matrix of the pose of the template 120. Further, a status in the bone group is adjusted in accordance with necessity. With the above operation, the pose or the movement of the template 120 is copied into the character 130. This operation is performed by the character pose determining unit 856.

Figure 7:
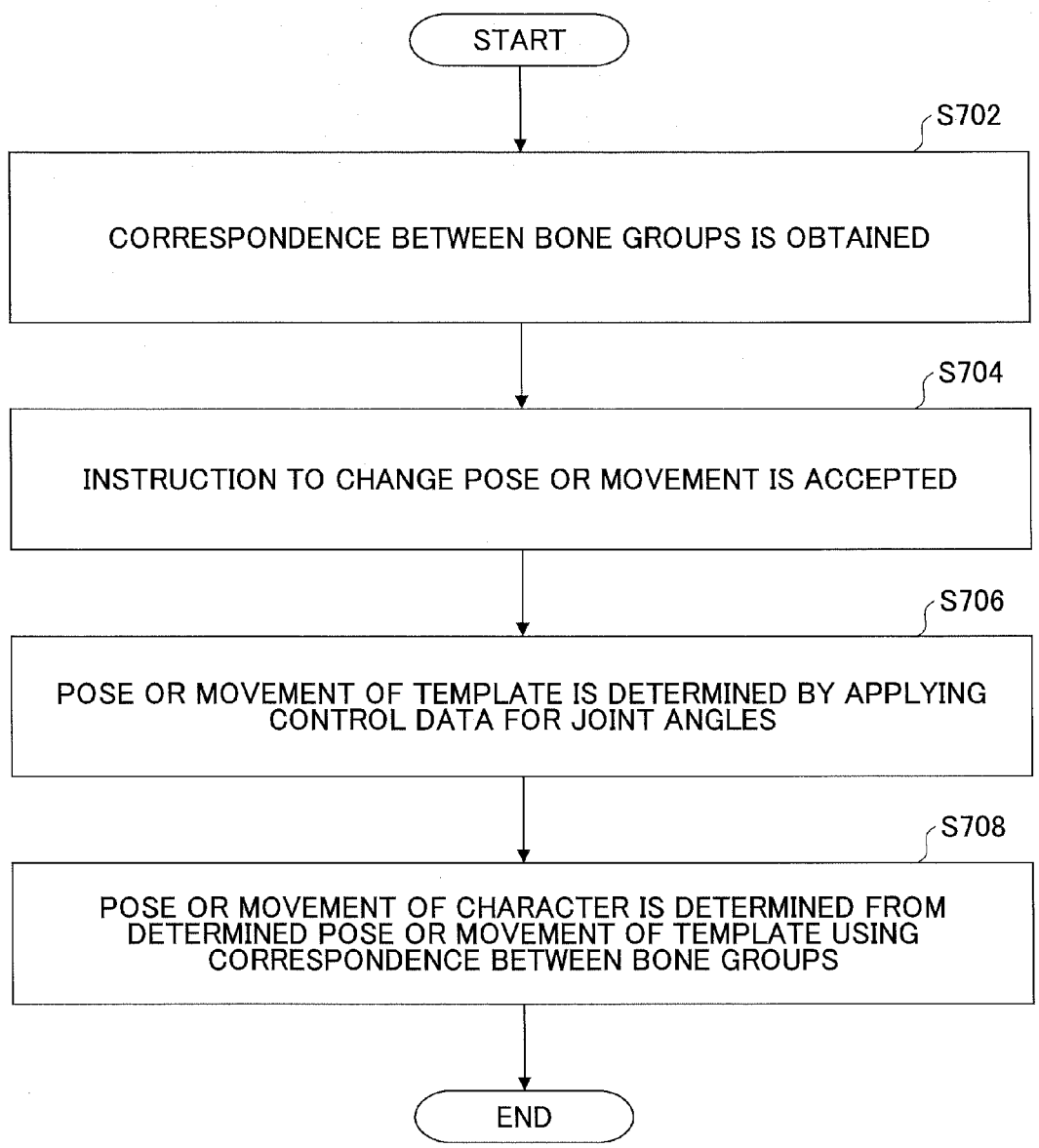
FIG. 7 is a flowchart showing an operation of controlling a model of an embodiment.

FIG. 7 is a flowchart showing an operation of the embodiment.

In step S702, the system 800 searches for a correspondence between the bone groups of the template 120 and the bone groups of the character 130. Alternatively, the correspondence between the bone groups may be designated by the operator.

In step S704, instruction to change the pose or the movement of the template 120 is accepted.

In step S706, the pose or the movement of the template 120 is determined by applying the control data for joint angles based on the instruction. As described above, when the pose or the movement of the template 120 selected by the operator is unnatural based on the control data for joint angles, the pose or the movement of the template 120 is not changed and an error message or the like is displayed for the operator.

In this embodiment, the pose selected by the operator is modified based on the control data for joint angles for the pose of the template 120.

In step S708, the pose or the movement of the character 130 is determined from the determined pose or movement of the template 120 using the correspondence between the bone groups.

With the above operation, the character 130 having a predetermined pose or movement is finally displayed.

(First Example and Second Example)

The first example and the second example are explained.

(1) First Example

Information whether the template 120 and the character 130 are having the same pose is not provided. Thus, the pose of the character 130 is changed in accordance with the pose of the template 120 while assuming that the template 120 and the character 130 are having the same pose when the directions of the bone axis and the bone group axis of the character 130 coincide the directions of the bone axis and the bone group axis of the template 120.

(2) Second Example

The template 120 and the character 130 having the same pose are provided as an initial state. Thus, the pose of the character 130 is changed in accordance with the pose of the template 130 while maintaining the relative relationship between the directions of the bone axis and the bone group axis of the character 130 and the directions of the bone axis and the bone group axis of the template 120 at the initial state.

The first example and the second example are explained in detail.

Parts of each of the skeleton models are connected in a parent-child relationship. Each of the parts of the skeleton models is referred to as a "node". A "bone" means a line segment connecting origins of two nodes which are in a parent-child relationship, or a node itself. The node which is at a parent side is referred to as a "starting point" and the node which is at a child side is referred to as an "end point".

For example, it is assumed that a child of a node n is a node n+1, and a bone generated by connecting these nodes is a bone m. At this time, the starting point of the bone m is the node n, and the end point is the node n+1. A directed line segment from the starting point to the end point is referred to as a "bone axis".

Similar to the parent-child relationship of the nodes, bones have a parent-child relationship. For the above example, the bone in which the node n is the end point becomes a parent of the bone m. The bone in which the node n+1 is the starting point becomes a child of the bone m.

In the first example, a coordinate system of the end point of the bone is assumed as a "coordinate system of the bone" where an associated object of the bone is expressed by a coordinate system of a parent bone of the bone.

On the other hand, in the second example, a coordinate system of the starting point of the bone is assumed as a "coordinate system of the bone" where an associated object of the bone is expressed by the coordinate system of the bone.

Figure 20A:
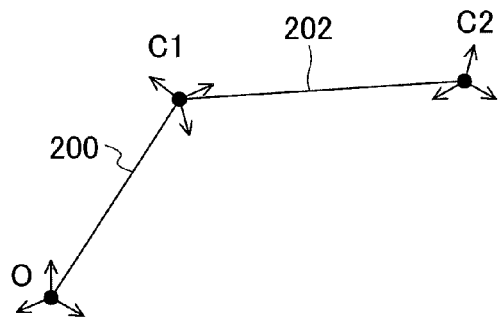
FIG. 20A to FIG. 20C are views showing a difference between skeleton models of a first example and a second example.

FIG. 20A is a view showing a part of a skeleton model including a standard node with a coordinate system O, a child node of the standard node with a coordinate system C1, and further a child node with a coordinate system C2.

For the first example, as shown in FIG. 20A, the skeleton model includes two bones 200 and 202 from the parent side. A coordinate system of the bone 200 is the coordinate system C1 which is at the end point of the bone 200. Similarly, a coordinate system of the bone 202 is the coordinate system C2 which is at the end point of the bone 202.

Figure 20B:
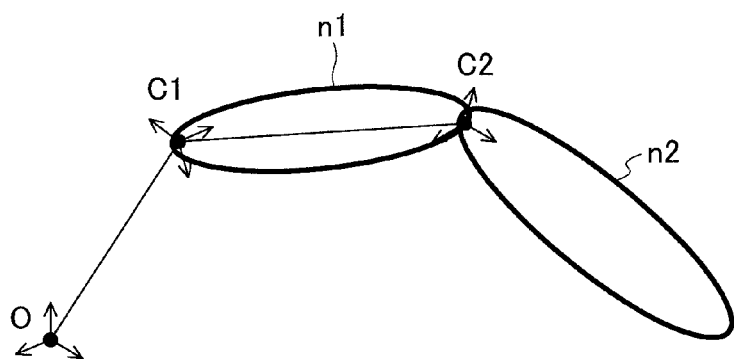

In FIG. 20B, actual nodes n1 and n2 (body portions of the skeleton model) are also overlapped on the skeleton model shown FIG. 20A. The coordinate system of the node n1 is the coordinate system C1 and the coordinate system of the node n2 is the coordinate system C2.

Figure 20C:
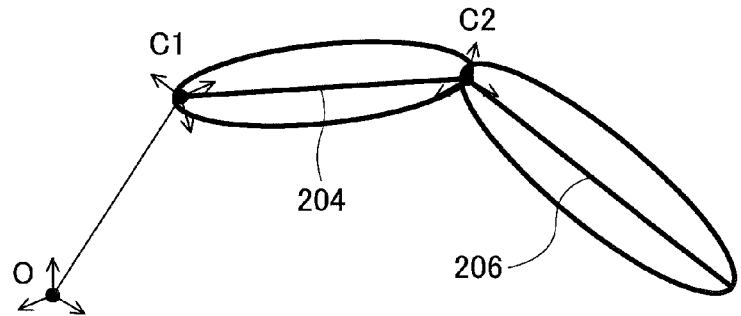

For the second example, as shown in FIG. 20C, the skeleton model includes two bones 204 and 206 from the parent side. A coordinate system of the bone 204 is the coordinate system C1 which is at the starting point of the bone 204.

Figure 21:
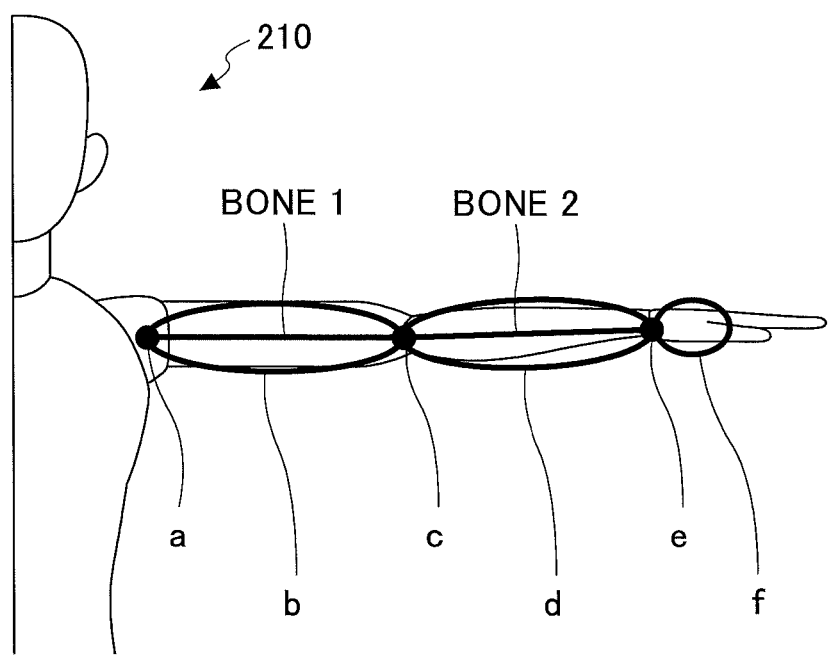
FIG. 21 is a view showing a difference between skeleton models of a first example and a second example.

These differences of the examples are explained with reference to FIG. 21, in which an arm of a skeleton model 210 is shown as an example.

The skeleton model 210 includes a shoulder "a", a brachium "b", an elbow "c", a forearm "d", a wrist "e" and a hand "f". The brachium "b", the forearm "d" and the hand "f" are nodes, respectively. The shoulder "a" is the origin of the node of the brachium "b", the elbow "c" is the origin of the node of the forearm "d", and the wrist "e" is the origin of the node of the hand "f". As shown in FIG. 21, the shoulder "a" to the elbow "c" is referred to as a bone 1, and the elbow "c" to the wrist "e" is referred to as a bone 2.

For the first example, the coordinate system of the bone 1 is determined as the coordinate system of the forearm "d" whose origin is the elbow "c", and the coordinate system of the bone 2 is determined as the coordinate system of the hand "f" whose origin is the wrist "e".

On the other hand, for the second example, the coordinate system of the bone 1 is determined as the coordinate system of the brachium "b" whose origin is the shoulder "a", and the coordinate system of the bone 2 is determined as the coordinate system of the forearm "d" whose origin is the elbow "c".

1. First Example in Detail 1.1. Node, Bone and Bone Group (1.1.1. Node and Bone)

As described above, the coordinate system of the end point of the bone is determined as the "coordinate system of the bone" where the associated object of the bone is expressed by a coordinate system of a parent bone of the bone.

(1.1.2. Bone Group)

The bone group means an assembly of linearly connected one or more bones. Here, a connecting portion of two bones needs to be a starting point of one of the bones and an end point of the other of the bones. One end of the bone group at a parent side is referred to as a "starting point of the bone group", and another end of the bone group at a parent side is referred to as an "end point of the bone group".

The bone groups have a parent-child relationship similar to that of the bones.

The coordinate system of an end bone is used as the coordinate system of the bone group.

The n-th bone group of the template 120 corresponds to the n-th bone group of the character 130. These corresponding bone groups of the template 120 and the character 130 are referred to as a "bone group pair".

1.2. Definition of Symbols, Basic Equations or the Like (1.2.1. Common Symbols)

In the following, "'" means it is related to the template 120, and without "'" means it is related to the character 130.

"$^{(ini)}$" means an initial state (initial pose) of a bone, and without "$^{(ini)}$" means a current state (current pose) of a bone.

"$_G$" means a bone group.

(1.2.2. Bones of Character and Template)

It is assumed that an n-th bone of the character 130 is referred to as a character bone $CB_n$. Further, a parent character bone of the character bone $CB_n$ is referred to as $CB_{n-1}$.

$L_n$ means a local matrix of the character bone $CB_n$ that expresses a position (trans) and rotation (rotate) of the character bone $CB_n$ in the $CB_{n-1}$ coordinate system.

$M_n$ means an object matrix of the character bone $CB_n$ that expresses a position (trans) and rotation (rotate) of the character bone $CB_n$ in the object coordinate system (=node 0 origin).

$$M_n = L_n L_{n-1} \ldots L_1 = L_n M_{n-1}$$

$L_n^{(ini)}$ means the local matrix "$L_n$" of the character bone $CB_n$ at the initial state of the character 130.

$M_n^{(ini)}$ means the object matrix "$M_n$" of the character bone $CB_n$ at the initial pose of the character 130.

$$M_n^{(ini)} = L_n^{(ini)} L_{n-1}^{(ini)} \ldots L_1^{(ini)} = L_n^{(ini)} M_{n-1}^{(ini)}$$

Similarly, it is assumed that an n-th bone of the template 120 is referred to as a template bone $TB_n$. Further, a parent template bone of the template bone $TB_n$ is referred to as $TB_{n-1}$.

$L'_n$ means a local matrix of the template bone $TB_n$ that expresses a position (trans) and rotation (rotate) of the template bone $TB_n$ in the $TB_{n-1}$ coordinate system.

$M'_n$ means an object matrix of the template bone $TB_n$ that expresses a position (trans) and rotation (rotate) of the template bone $TB_n$ in the object coordinate system (=node 0 origin).

$$M'_n = L'_n L'_{n-1} \ldots L'_1 = L'_n M'_{n-1}$$

$L'_n{}^{(ini)}$ means the local matrix "$L'_n$" of the template bone $TB_n$ at the initial pose of the template 120.

"$M'_n{}^{(ini)}$" means the object matrix "$M'_n$" of the template bone $TB_n$ at the initial pose of the template 120.

$$M_n'^{(ini)} = L_n'^{(ini)} L_{n-1}'^{(ini)} \ldots L_1'^{(ini)}$$
$$= L_n'^{(ini)} M_{n-1}'^{(ini)}$$

(1.2.3. Bone Groups of Character and Template)

It is assumed that an n-th bone group of the character 130 is referred to as a character bone group $CBG_n$. Further, a parent character bone group of the character bone group $CBG_n$ is referred to as $CBG_{n-1}$.

$L_{Gn}$ means a local matrix of the character bone group $CBG_n$ that expresses a position (trans) and rotation (rotate) of the end point of the character bone group $CBG_n$ in the $CBG_{n-1}$ coordinate system. When it is assumed that the bones constituting the character bone group $CBG_n$ are $CB_{m'''}, \ldots, CB_{m-1}, CB_m$, from the parent side, the following equation can be obtained.

$$L_{Gn} = L_m L_{m-1} \ldots L_{m'''}$$

"$M_{Gn}$" means an object matrix of the character bone group $CBG_n$ that expresses a position (trans) and rotation (rotate) of the end point of the character bone group $CBG_n$ in the object coordinate system (=node 0 origin).

$$M_{Gn} = L_{Gn} L_{Gn-1} \ldots L_{G1} = L_{Gn} M_{Gn-1} = L_m L_{m-1} \ldots L_{m'''} M_{m'''-1} = M_m$$

"$L_{Gn}{}^{(ini)}$" means the local matrix $L_{Gn}$ of the character bone group $CBG_n$ at the initial pose of the character 130.

$$L_{Gn}^{(ini)} = L_m^{(ini)} L_{m-1}^{(ini)} \ldots L_{m'''}^{(ini)}$$

"$M_{Gn}{}^{(ini)}$" means the object matrix $M_{Gn}$ of the character bone group $CBG_n$ at the initial pose of the character 130.

$$M_{Gn}^{(ini)} = L_{Gn}^{(ini)} L_{Gn-1}^{(ini)} \ldots L_{G1}^{(ini)}$$
$$= L_{Gn}^{(ini)} M_{Gn-1}^{(ini)}$$
$$= L_m^{(ini)} L_{m-1}^{(ini)} \ldots L_{m'''}^{(ini)} M_{m'''-1}^{(ini)}$$
$$= M_m^{(ini)}$$

Similarly, it is assumed that an n-th bone group of the template 120 is referred to as a template bone group $TBG_n$. Further, a parent template bone group of the template bone group $TBG_n$ is referred to as $TBG_{n-1}$.

"$L'_{Gn}$" means a local matrix of the template bone group $TBG_n$ that expresses a position (trans) and rotation (rotate) of the end point of the template bone group $TBG_n$ in the $TBG_{n-1}$ coordinate system. When it is assumed that the bones constituting the template bone group $TBG_n$ are $TB_{k'''}, \ldots, TB_{k-1}, TB_k$, from the parent side, the following equation can be obtained.

$$L_{G'n} = L'_k L'_{k-1} \ldots L'_{k''}$$

"$M_{G'n}$" means an object matrix of the template bone group $TBG_n$ that expresses a position (trans) and rotation (rotate) of the end point of the template bone group $TBG_n$ in the object coordinate system (=node 0 origin).

$$\begin{aligned} M_{G'n} &= L_{G'n} L_{G'n-1} \ldots L_{G'1} \\ &= L_{G'n} M_{G'n-1} \\ &= L'_k L'_{k-1} \ldots L'_{k''} M'_{k''-1} \\ &= M'_k \end{aligned}$$

"$L_{G'n}^{(ini)}$" means the local matrix $L_{G'n}$ of the template bone group $TBG_n$ at the initial pose of the template 120.

$$L_{G'n}^{(ini)} = L'_k{}^{(ini)} L'_{k-1}{}^{(ini)} \ldots L'_{k''}{}^{(ini)}$$

"$M_{G'n}^{(ini)}$" means the object matrix $M_{G'n}$ of the template bone group $TBG_n$ at the initial pose of the template 120.

$$\begin{aligned} M_{G'n}^{(ini)} &= L_{G'n}^{(ini)} L_{G'n-1}^{(ini)} \ldots L_{G'1}^{(ini)} \\ &= L_{G'n}^{(ini)} M_{G'n-1}^{(ini)} \\ &= L'_k{}^{(ini)} L'_{k-1}{}^{(ini)} \ldots L'_{k''}{}^{(ini)} M'_{k''-1}{}^{(ini)} \\ &= M'_k{}^{(ini)} \end{aligned}$$

Figure 9:
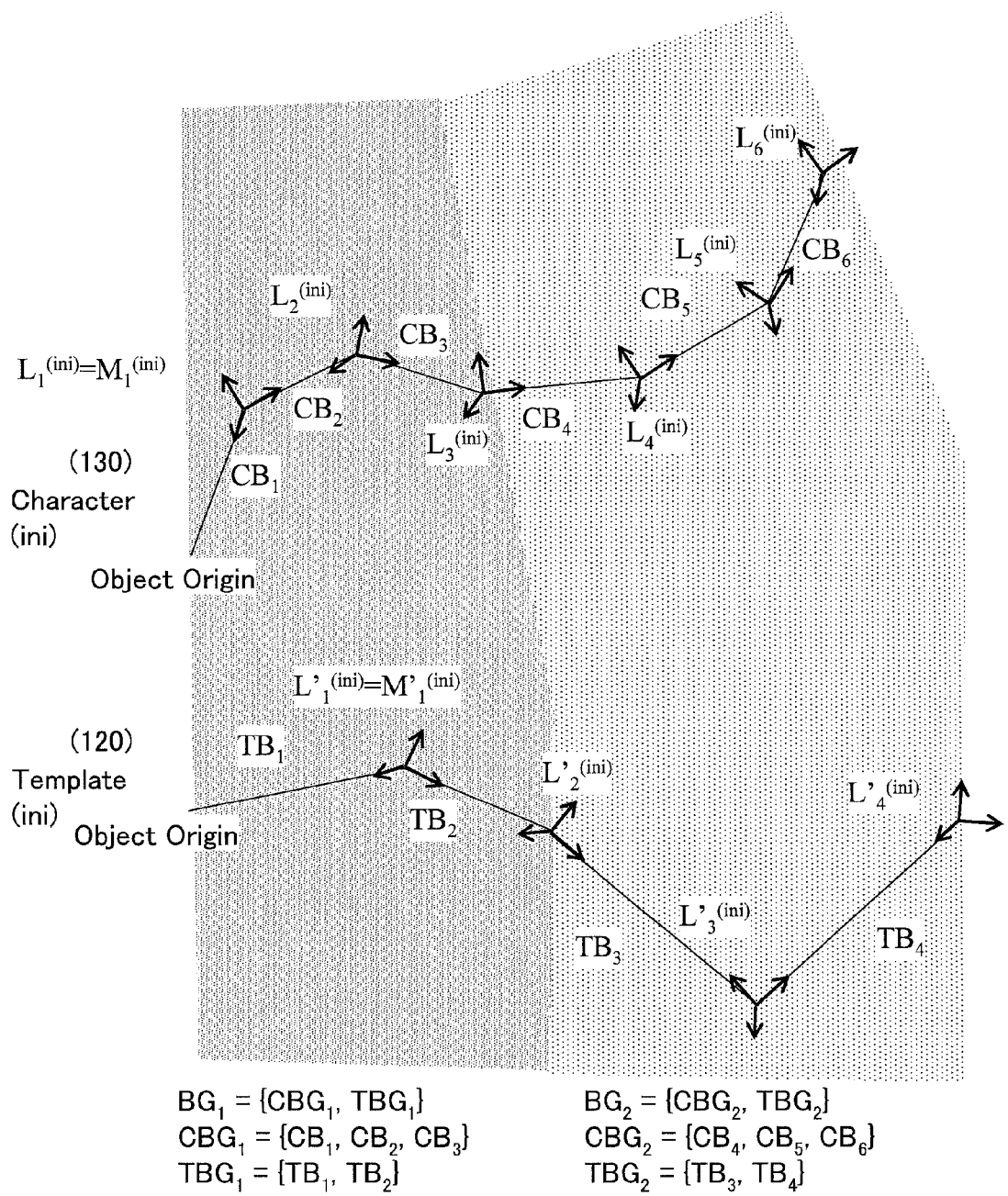
FIG. 9 is a view showing two corresponding bone groups of the character and the template.

FIG. 9 is a view showing two corresponding bone groups of the template 120 and the character 130.

1.3. Copy of Pose

In an operation of copying the pose, information about an initial pose of the template 120 and an initial pose of the character 130 are provided first. Here, the initial poses of the template 120 and the character 130 are not necessarily the same.

Thereafter, the poses (current poses) of the bones of the template 120 are successively provided so that the statuses (matrix of each bone) of the character 130 having the same poses are to be determined.

First, a direction of the bone group of the character 130 is obtained based on the direction of the bone group of the template 120. Subsequently, directions of the bones in the bone groups are obtained.

1.4. Coordinate System Adjusting Matrix

The coordinate systems of the bone groups of the template 120 and the character 130 are different. Thus, as described above, first, a "coordinate system adjusting matrix" that expresses a relationship between the coordinate systems of the bone groups for the template 120 and the character 130 is calculated based on information about the character bone group and the template bone group at an initial state. This operation is performed once at first. This operation is explained. Here, the coordinate system adjusting matrix is a rotation matrix which does not change the length of the bone (trans unit is not specifically used).

(1.4.1. Generating Overlapped State)

It is assumed that a directed line segment from a starting point to an end point of a bone group is a "bone group axis". It is necessary to have directions of the bone group axes of the template 120 and the character 130 become the same in order to calculate the coordinate system adjusting matrix. Thus, an "overlapped state" is generated as follows.

Using the template 120 and the character 130 at an initial state, the pose of the character 130 is determined to match the pose of the template 120.

First, the bone groups $CBG_n$ of the character 130 at the initial state are rotated (by a simple rotation, which will be explained later) such that each of the directions of the axes of the bone groups $CBG_n$ becomes the same as the direction of the axis of the corresponding bone group $TBG_n$ of the template 120 at the initial state. With this operation, the character 130 comes to have the same pose as that of the template 120 at the initial state. This state of the character is referred to as an "overlapped state". The local matrix and the object matrix of the bone group are referred to as $L_{Gn}^{(ovl)}$ and $M_{Gn}^{(ovl)}$, respectively.

The overlapped state can be recursively obtained as follows. Here, it is assumed that $L_{Gn-1}^{(ovl)}$ and $M_{Gn-1}^{(ovl)}$ of the (n−1)th bone group are obtained (the directions of the axes of $CBG_n$ and $TBG_n$ coincide).

Here, a vector "vec" of the bone group axis of the character bone group $CBG_{n+1}$ of the character 130 in the coordinate system of the character bone group $CBG_n$ can be expressed as follows.

$$\text{vector "vec"} = \text{trans unit of } L_{Gn+1}^{(ini)} \quad (101)$$

Similarly, a vector "vecToTemplate" of the bone group axis of the template bone group $TBG_{n+1}$ of the template 120 in the coordinate system of the character bone group $CBG_n$ can be expressed as follows.

vector "vecToTemplate"

$$= \text{trans unit of} (M_{G'n+1}^{(ini)} - M_{G'n}^{(ini)})(L_{Gn}^{(ini)} M_{Gn-1}^{(ovl)})^{-1} \quad (102)$$

Here, the "simple rotation" is defined as follows.

A rotation that satisfies the following conditions is referred to as a simple rotation from unit vectors $v_a$ to $v_b$ where the unit vectors $v_a$ and $v_b$ have a common starting point.

The rotation is around an axis which is perpendicular to a plane formed by the unit vectors $v_a$ and $v_b$.

The unit vector $v_a$ overlaps the unit vector $v_b$ by the rotation.

Here, if the directions of the unit vectors $v_a$ and $v_b$ are the same, no rotation is performed (expressed by a unit matrix as the rotation matrix).

If the directions of the unit vectors $v_a$ and $v_b$ are opposite from each other, it is impossible to define.

(Rotation Matrix $H_n$)

Figure 10:
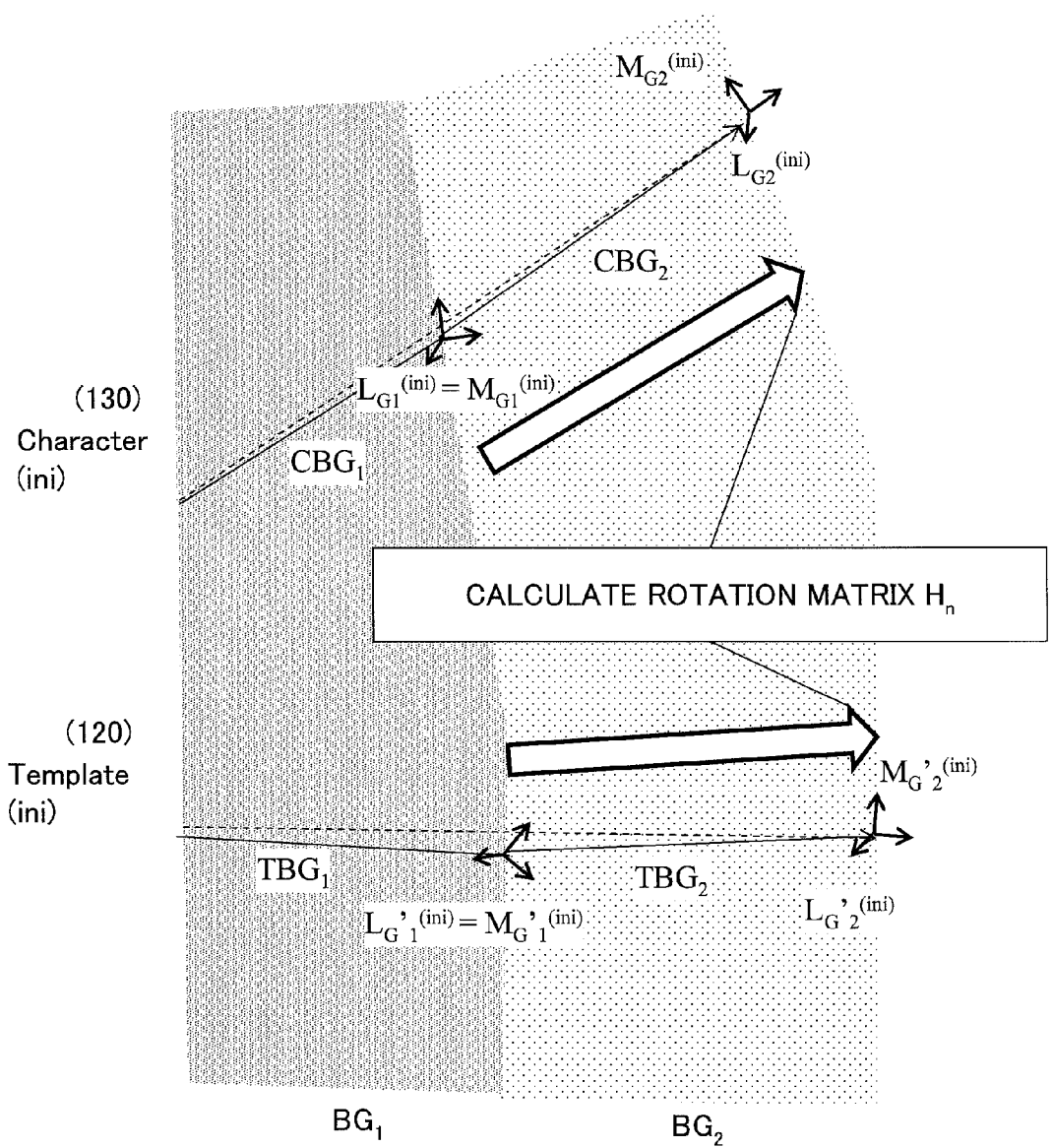
FIG. 10 is a view for explaining a method of obtaining a rotation matrix for obtaining an overlapped state.

As shown in FIG. 10, a rotation matrix $H_n$ to generate an overlapped state of the character bone group $CBG_{n+1}$ is calculated as follows.

$H_n$ means a simple rotation from "vec" to "vecTo-Template" (103)

$H_n$ is a rotation matrix in the coordinate system of the character bone group $CBG_n$.

By using the rotation matrix $H_n$, the local matrix $L_{Gn}^{(ovl)}$ of the character bone group $CBG_n$ at the overlapped state can be obtained as follows.

$$\begin{aligned} L_{Gn}^{(ovl)} &= H_n(\text{rotation unit of } L_{Gn}^{(ini)})(\text{trans unit of } L_{Gn}^{(ini)}) \\ &= H_n L_{Gn}^{(ini)} \end{aligned} \quad (104)$$

Further, the object matrix $M_{Gn}^{(ovl)}$ of the character bone group $CBG_n$ at the overlapped state can be obtained as follows.

$$M_{G1}^{(ovl)} = L_{G1}^{(ovl)} \quad (105)$$

$$M_{Gn}^{(ovl)} = L_{Gn}^{(ovl)} L_{Gn-1}^{(ovl)} \ldots L_{G1}^{(ovl)} \quad (106)$$

With this operation, the local matrix $L_{Gn}^{(ovl)}$ of the character bone group $CBG_n$ at the overlapped state, and the object matrix $M_{Gn}^{(ovl)}$ of the character bone group $CBG_n$ at the overlapped state are obtained.

(1.4.2. Calculating Coordinate System Adjusting Matrix $R_n$)

Figure 11:
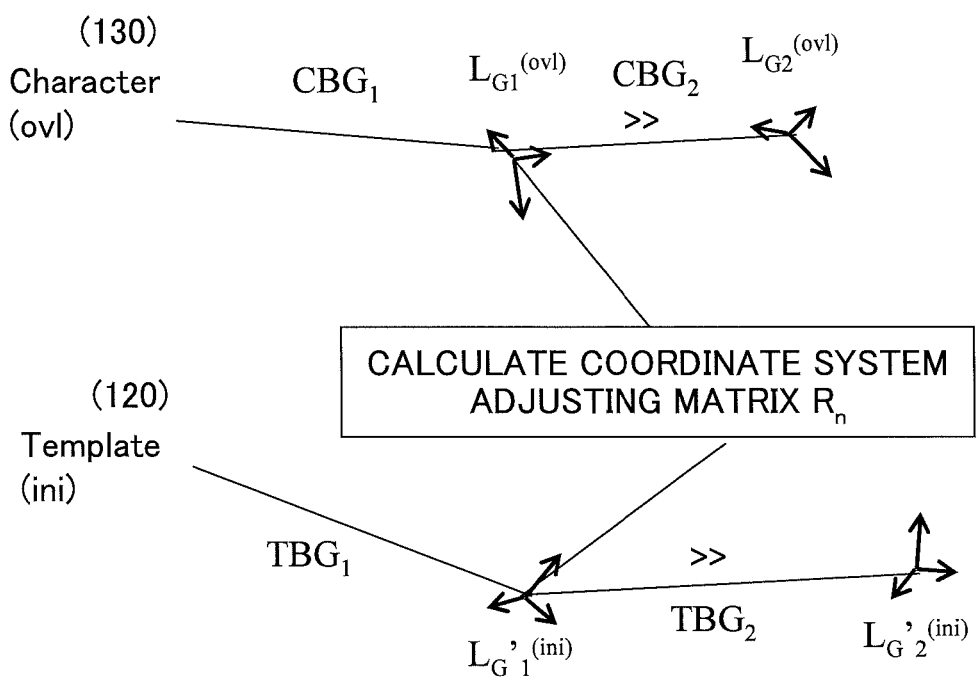
FIG. 11 is a view showing two coordinate systems of the character and the template.

FIG. 11 is a view showing two coordinate systems of the template 120 and the character 130.

By the operation explained above with reference to FIG. 10, the directions of the bone groups of the character 130 at the overlapped state $L_{Gn}^{(ovl)}$, $M_{Gn}^{(ovl)}$ and the template 120 at the initial state $L_{G'n}^{(ini)}$, $M_{G'n}^{(ini)}$ become the same. However, the coordinate systems of the bone groups are different. Thus, a "coordinate system adjusting matrix" $R_n$ which can adjust the difference in the coordinate systems is calculated. In this operation, the matrices in the equations do not include the trans unit.

$$M_{G'n}^{(ini)} = R_n M_{Gn}^{(ovl)} \quad (107)$$

The left side of the equation (107) can be expressed as follows by breaking down.

$$M_{G'n}^{(ini)} = R_n L_{Gn}^{(ovl)} M_{Gn-1}^{(ovl)} \quad (108)$$

Further, when inputting "n−1" in "n" of the equation (107) to obtain $M_{Gn-1}^{(ovl)}$, the next equation is obtained.

$$M_{Gn-1}^{(ovl)} = (R_{n-1})^{-1} M_{G'n-1}^{(ini)} \quad (109)$$

From the equations (108) and (109), the next equation can be obtained.

$$M_{G'n}^{(ini)} = R_n L_{Gn}^{(ovl)} (R_{n-1})^{-1} M_{G'n-1}^{(ini)} \quad (110)$$

On the other hand, as $M_{G'n}^{(ini)}$ can be expressed as $M_{G'n}^{(ini)} = L_{G'n}^{(ovl)} M_{G'n-1}^{(ini)}$, the next equation is obtained.

$$L_{G'n}^{(ini)} = R_n L_{Gn}^{(ovl)} (R_{n-1})^{-1} \quad (111)$$

With this, $R_n$ can be recursively obtained as follows.

$$R_1 = (\text{rotation unit of } L_{G'n}^{(ini)})(L_{G1}^{(ovl)})^{-1} \quad (112)$$

$$R_n = (\text{rotation unit of } L_{G'n}^{(ini)} R_{n-1})(L_{Gn}^{(ovl)})^{-1} \quad (113)$$

1.5. Determining Character State

By the operation explained above with reference to FIG. 11, the coordinate system adjusting matrix $R_n$ that expresses a relationship between the template 120 and the character 130 is obtained.

Thus, the state of the character 130 is determined to take the same pose as the pose (current state) (rotate, trans) of the template 120 which is successively obtained.

First, the state of the bone group is calculated, and then, the state of the bone in the bone group is obtained.

(1.5.1. Determining Current State of Character Bone Group $CBG_n$)

The current state of the character 130 is determined for each of the bone groups. At this time, the coordinate system adjusting matrix $R_n$ is used.

The current local matrix of the character bone group $CBG_n$ can be determined as follows using the current local matrix of the terminal bone group $TBG_n$.

Rotation of $L_{Gn}$ $$= (R_n)^{-1} (\text{rotation of } L_{G'n}) R_{n-1} \quad (114)$$

With this, the current state of the character bone group $CBG_n$ is determined.

(1.5.2. Determining Current State of Character Bone in Character Bone Group $CBG_n$)

Subsequently, the current state of the character bone in the character bone group $CBG_n$ is determined.

Figure 12:
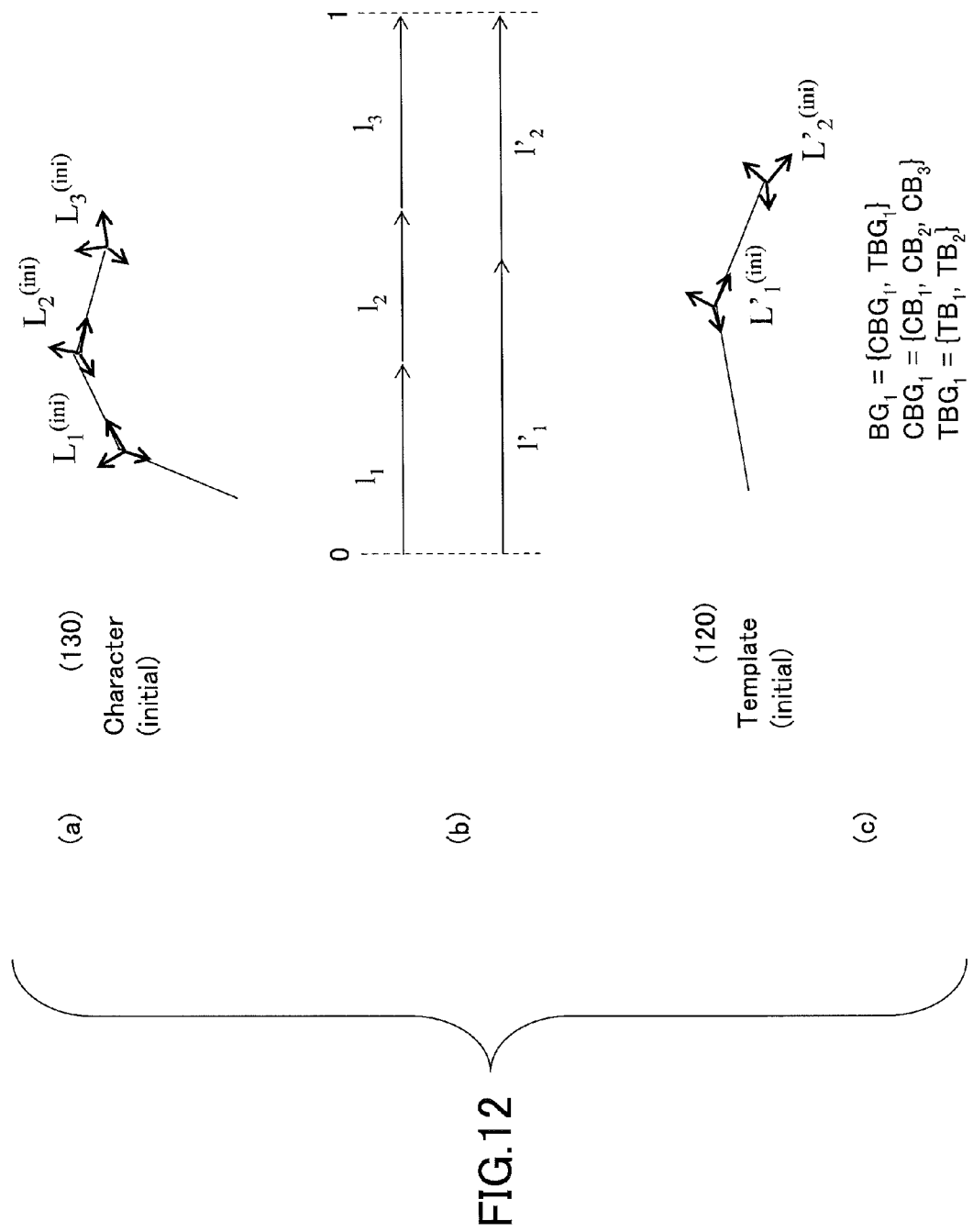
FIG. 12 is a view showing states of bones in bone groups.

FIG. 12 is a view showing states of bones in the bone groups.

In this process, the ratio of the length of each of the bones is used so that a coefficient $d_m$ for position conversion of the character bones and the template bones in the bone groups at the initial state and accumulated lengths are calculated.

As shown in FIG. 12, a length of a character bone $CB_m$ which is normalized such that a total length of the bones in the bone group becomes 1 is referred to as $l_m$. Similarly, a length of a template bone $TB_k$ which is normalized such that a total length of the bones in the bone group becomes 1 is referred to as $l'_k$.

Further, in order to simply calculate the accumulated length of the character bones from the accumulated length of the template bones, a coefficient (ratio) $d_m$ for the fraction of lengths is obtained as follows.

$$\Sigma_{(i=1-m)} l_i = \Sigma_{(i=1-k-1)} l'_i + d_m * l_k \quad (115)$$

Figure 13:
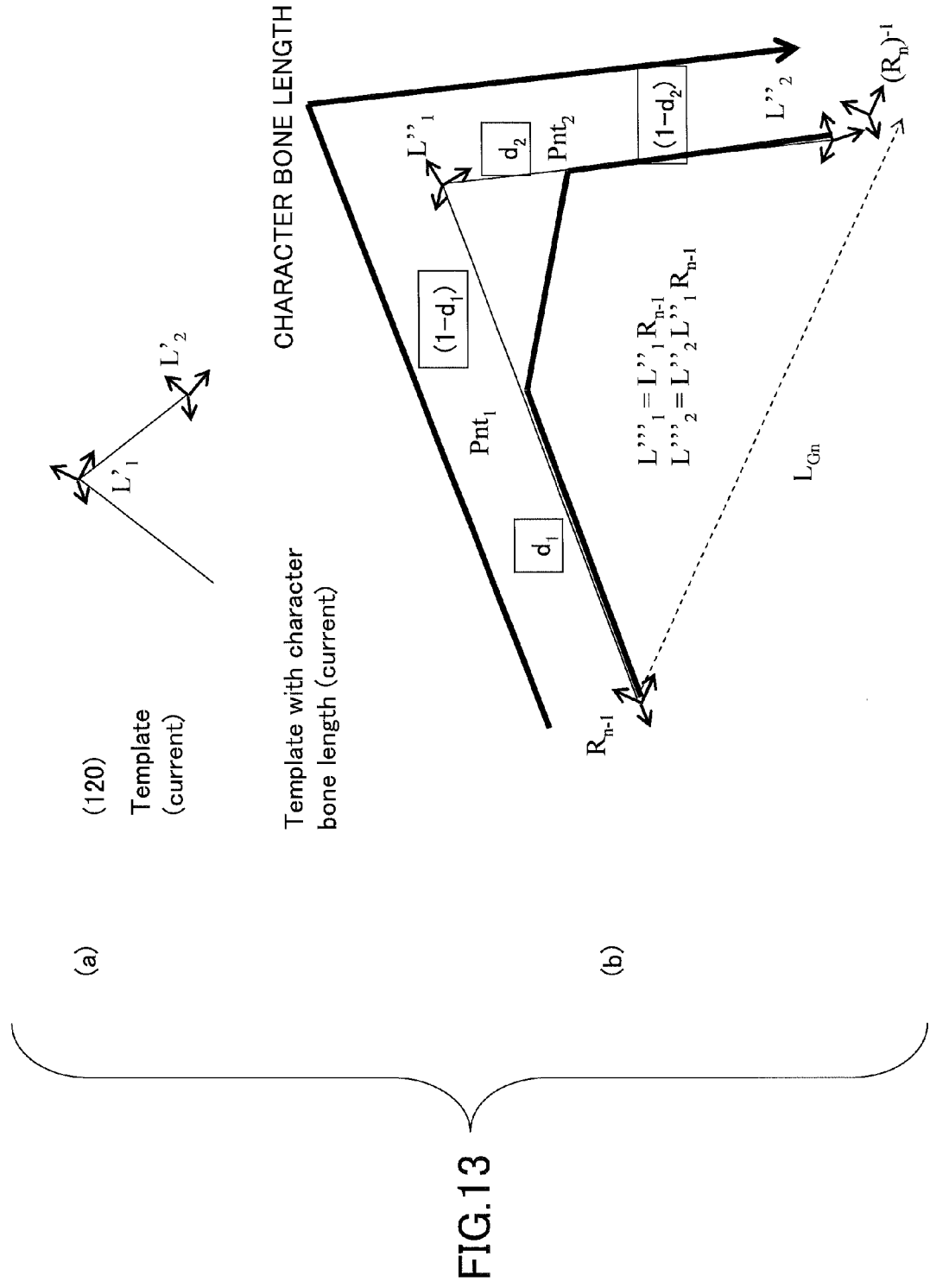
FIG. 13 is a view showing an example of current template bones in a bone group coordinate system.

FIG. 13 is a view showing an example of the current character bones in the bone group coordinate system.

As shown in FIG. 13, using the coefficient (ratio) $d_m$, the total length of the current template bones is divided by a ratio of the length of the character bone. With this operation, the current position of the character bone in the bone group coordinate system can be calculated.

A ratio of the total length of the template bones in the bone group and the total length of the character bones in the corresponding bone group is referred to as a ratio. $L''_k$ is defined as a multiple obtained by multiplying the ratio by the trans unit of $L'_k$.

As described above in the equation (114), the following relation exists for the

Rotation of $L_{Gn}$ $$= (R_n)^{-1} (\text{rotation of } L_{G'n}) R_{n-1} \quad (116)$$

Thus, $L_{Gn}$ can be expressed as follows.

$$L_{Gn} = (R_n)^{-1} L''_k L''_{k-1} \ldots R_{n-1} \quad (117)$$

First, $L'''_k$ is defined as follows in order to first determine the end point of the character bone.

$$L'''_k = L''_k L''_{k-1} \ldots R_{n-1}$$

$$L'''_{k-1} = L''_{k-1} \ldots R_{n-1} \quad (118)$$

At this time, the current end point position $Pnt_m$ of the character bone $CB_m$ in the bone group coordinate system becomes as follows by interpolating a trans between $L'''_{k-1}$ and $L'''_k$ by $d_m$.

$$Pnt_m = \text{trans of}((1-d_m) * L'''_{k-1} + d_m * L'''_k) \quad (119)$$

FIG. 13 shows the operation of determining the character bone $CB_m$.

FIG. 14 is a view for explaining an operation of determining a pose of the character.

With the above process, the direction of the axis of the character bone $CB_m$ is determined. However, "torsion" around the axis is not determined. Thus, the character bone $CB_m$ is determined using a simple rotation $Q_m$ from the axis direction (initVec) at the initial state to the determined axis direction (currentVec) as shown in FIG. 13.

When the axis directions are expressed in the $CB_{m-1}$ coordinate system, these become as follows.

$$\text{vector initVec:(trans of } L_{m+1}^{(ini)})(\text{rotation of } L_m^{(ini)}) \quad (120)$$

$$\text{vector currentVec:trans of}(Pnt_{m+1}-Pnt_m)(W_{m'-1})^{-1} \quad (121)$$

Here, $W_{m'}$ is an integrating matrix in the bone group as follows.

$$W_{m'}=L_m \cdot L_{m'-1} \ldots L_m \quad (122)$$

As $W_{m'}=L_{m'} W_{m'-1}$, these values can be recursively obtained from $L_m$.

However, only for the last bone $L_{m'}$ in the bone group, it is obtained by a backcalculation from $L_{Gn}$ so that $L_{Gn}=L_m L_{m'-1} \ldots L_m$ is complied with.

$$\text{For } L_1, \text{rotation is } L_1^{(ini)}Q_1 \text{ and trans is } Pnt_1 \quad (123)$$

$$W_1=L_1 \quad (124)$$

$$\text{For } L_m, \text{rotation is } L_m^{(ini)}Q_n \text{ and trans is } Pnt_m(W_{m''-1})^{-1} \quad (125)$$

$$W_{m'}=L_m \cdot W_{m'-1} \quad (126)$$

Here, when m=m', the end point bone can be expressed as follows.

$$L_{m'}=L_{Gn}(W_{m'-1})^{-1} \quad (127)$$

As described above, the local matrix of each of the character bones can be obtained and the pose of the character 130 is determined.

2. Second Example in Detail
2.1. Structure of Skeleton Model
(2.1.1. Node, Bone)

Parts of the skeleton model are connected in a parent-child relationship. Each of the parts is referred to as a "node". A "bone" is a node. The origin of the node is referred to as a starting point of the bone, and the origin of one of the child nodes is referred to as an end point of the bone. A directed line segment from the starting point to the end point is referred to as a "bone axis". A vector that expresses the bone axis is referred to as a "bone axis vector", and a normalized result of the bone axis vector to be a magnitude of 1 is referred to as a "bone axis unit vector". The magnitude of the bone axis vector is a length of the bone.

(2.1.2. Template and Character)

When copying a pose of a skeleton model to another skeleton model, the skeleton model from which the pose is copied is referred to as a "template", the skeleton model to which the pose is copied is referred to as a "character". Generally, the number of nodes included in the template and the number of nodes included in the character are different. Further, there are no particular rules in directions of the coordinate systems of the nodes, respectively, so that the directions of the coordinate systems are different from each other.

(2.1.3. Bone Group)

A "bone group" means an assembly of linearly connected one or more bones. Here, it is necessary that all of the adjacent bones have a relationship "parent to child" (or all of the adjacent bones have a relationship "child to parent") when checking from one end of the bone group to another end of the bone group. Among both ends of the bone group, a parent side end becomes a starting point, and a child side end becomes an end point. More accurately, the starting point of the bone at the most parent side of the bone group becomes a starting point of the bone group. Similarly, the end point of the bone at the most child side of the bone group becomes the end point of the bone group. A directed line segment from the starting point toward the end point of the bone group is referred to as a "bone group axis". A vector that expresses the bone group axis is referred to as a "bone group axis vector", and a normalized result of the bone group axis vector to be a magnitude of 1 is referred to as a "bone group axis vector unit".

The bones included in the skeleton model are divided into plural of the bone groups. Here, each of the bones does not belong to more than one bone group. The parent-child relationship of the bone groups is similar to the parent-child relationship of the bones.

Prior to copying the pose of the template to the character, the bone groups are formed for both the template and the character, and the bone groups which are at the similar part of the template and the character are in correspondence with each other in 1 to 1 relationship.

When copying the pose, first, the direction of the bone group of the character is determined to coincide based on the direction of the corresponding bone group of the template. Then, the directions of the bones in the bone group are determined.

2.2. Coordinate System
(2.2.1. Coordinate System of Bone)

Each of the nodes has a coordinate system. The coordinate system of a bone means a coordinate system of the node which corresponds to the bone. As described above, there are no particular rules in directions of the coordinate systems of the nodes (bones). Thus, the vector which expresses the direction of the bone axis in the coordinate system of the bone becomes different for each of the bones. For example, the bone axis may be in an x-axis direction of the bone for one bone, while the bone axis may be in a y-axis direction of the bone for another bone.

(2.2.2. Coordinate System of Bone Group)

It is defined that a coordinate system of a bone group is a multiple obtained by multiplying a coordinate system of a first bone which is at the most parent side of the bone group with "a simple rotation from a first bone axis to the bone group axis". For the simple rotation, see a following Appendix A.

(2.2.3. Object Coordinate System)

Although there are no particular rules in the direction of the coordinate system of the bone, there is an exception for the bone at the most parent side. The node at the most parent side in each of the skeleton models is referred to as a "root node". In this example, it is assumed that directions of the coordinate systems of the root nodes are the same for all of the skeleton models. For example, a front of each of the skeleton models becomes the z-axis and a top of each of the skeleton models becomes the y-axis. The coordinate system of the root node (root bone) is referred to as an "object coordinate system".

(2.2.4. Object Matrix, Local Matrix)

In order to express the direction of a bone (posture or rotation) by a matrix, a reference coordinate system is also necessary in addition to the coordinate system of the respective bone. The matrix represented by using the object coordinate system as a standard coordinate system is referred to as an object matrix of the bone. The matrix represented by using the parent coordinate system as the standard coordinate system is referred to as a local matrix of the bone. The same can be referred to for the bone groups.

2.3. Symbol, Basic Equations

Symbols are defined as follows.

$TBG_n$: n-th template bone group.
$CBG_n$: n-th character bone group.

$BG_n$: n-th bone group pair composed of $TBG_n$ and $CBG_n$.
$M_{Gn}'$: object matrix of $TBG_n$.
$L_{Gn}'$: local matrix of $TBG_n$.
$M_{Gn}$: object matrix of $CBG_n$.
$L_{Gn}$: local matrix of $CBG_n$.
$TB_k$: k-th template bone.
$M_k'$: object matrix of $TB_k$.
$L_k'$: local matrix of $TB_k$.
$CB_m$: m-th character bone.
$M_m$: object matrix of $CB_m$.
$L_m$: local matrix of $CB_m$.

As described above, "'" means the template, and without "'" means the character. Further, "$'^{(ini)}$" means an initial state (initial pose) of a bone, without "$^{(ini)}$" means a current state (current pose) of a bone. Unless otherwise noted, the number (index) increases one by one from the parent to the child. It is assumed that the matrix size is three rows by three columns, and for the alignment of the components, a row vector is multiplied by a matrix from right side.

There is a following relationship between the object matrix and the local matrix.

$$M_{Gn} = L_{Gn} L_{Gn-1} L_{Gn-2} \quad (201)$$

$$= L_{Gn} M_{Gn-1} \quad (202)$$

This same relationship can be applied for the template bone group. Similarly, the same relationship can be applied for the object matrix and the local matrix of the bone.

2.4. Copying Pose (2.4.1. Initial State)

In this example, it is assumed that initial states of the template and the character are previously provided where the template and the character take the same pose at the initial state. Here, the "same pose" does not mean that the bone (or the bone group) of the template and the character are directed in the same direction.

Figure 15:
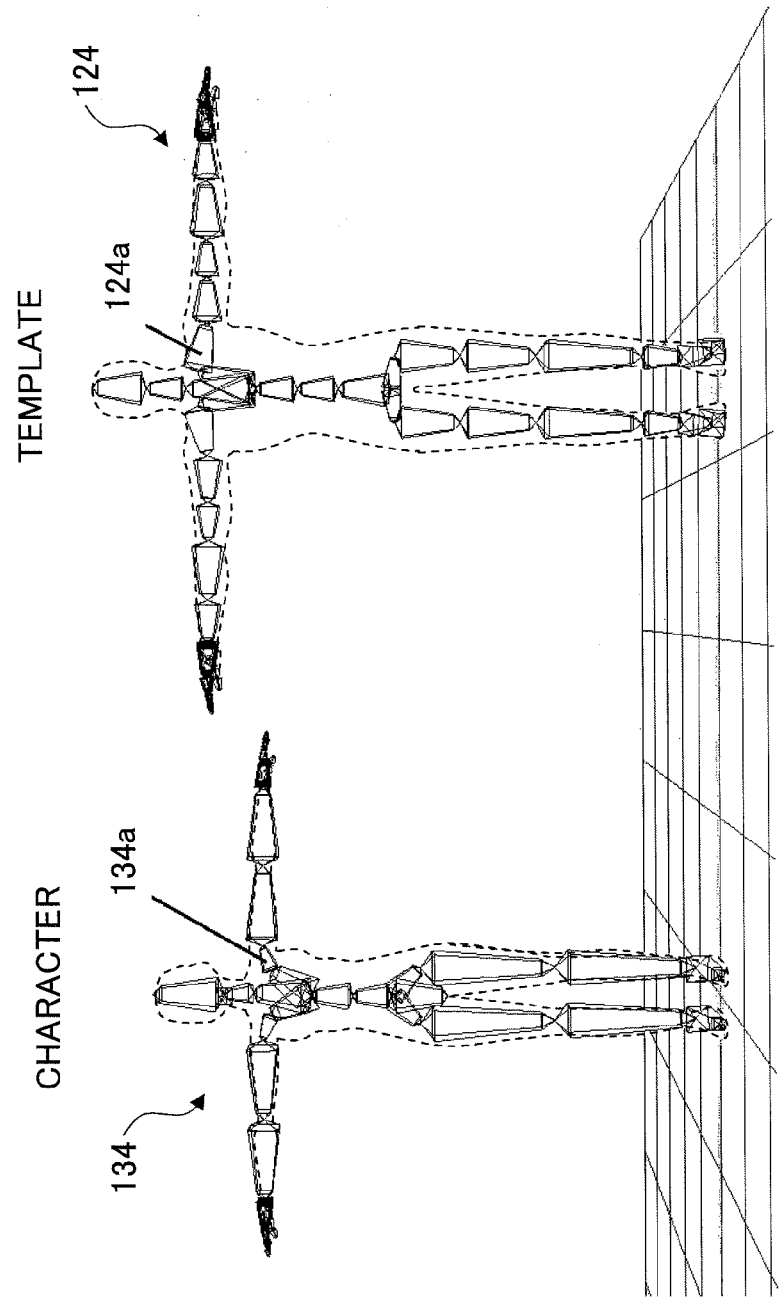
FIG. 15 is a view showing an example of a template skeleton model and a character skeleton model at an initial state.

FIG. 15 is a view showing an example of a template (standard skeleton model 124) and a character (target skeleton model 134) at initial states. Although both of the template and the character take the same pose, directions of collarbones 124a and 134a, respectively, of them are different, as can be understood from FIG. 15.

(2.4.2. Copying Pose)

"Copying pose" means to determine a pose of the target skeleton model 134 to be the same as a pose (current pose) of the standard skeleton model 124 when the current pose of the standard skeleton model 124 is provided.

In this example, the object matrices $M_{k'}$ of all of the bones of the standard skeleton model 124 are provided. Then, the object matrices $M_m$ of all of the bones of the target skeleton model 134 are to be determined.

When copying the pose, first, the direction of each of the character bone groups of the target skeleton model 134 is determined based on the direction of the corresponding template bone group of the standard skeleton model 124. Subsequently, the directions of the character bones in the character bone group are determined.

(2.4.3. Determining Direction)

The coordinate system is different for each of the bone groups, similar in the fact that the coordinate system is different for each of the bones. Thus, a coordinate system adjusting matrix for converting the coordinate system of the template bone group to the coordinate system of the corresponding character bone group is obtained.

When determining the direction of the character bone group based on the current direction of the template bone group, the coordinate system adjusting matrix is used. In addition, it is necessary to take the difference between the directions of the template bone group and the character bone group at the initial pose into consideration.

2.5. Coordinate System Adjusting Matrix

First, the coordinate system adjusting matrix is obtained. It is necessary to perform this process only once when the initial poses of the template and the character are provided.

(2.5.1. Correcting Initial State)

Figure 16:
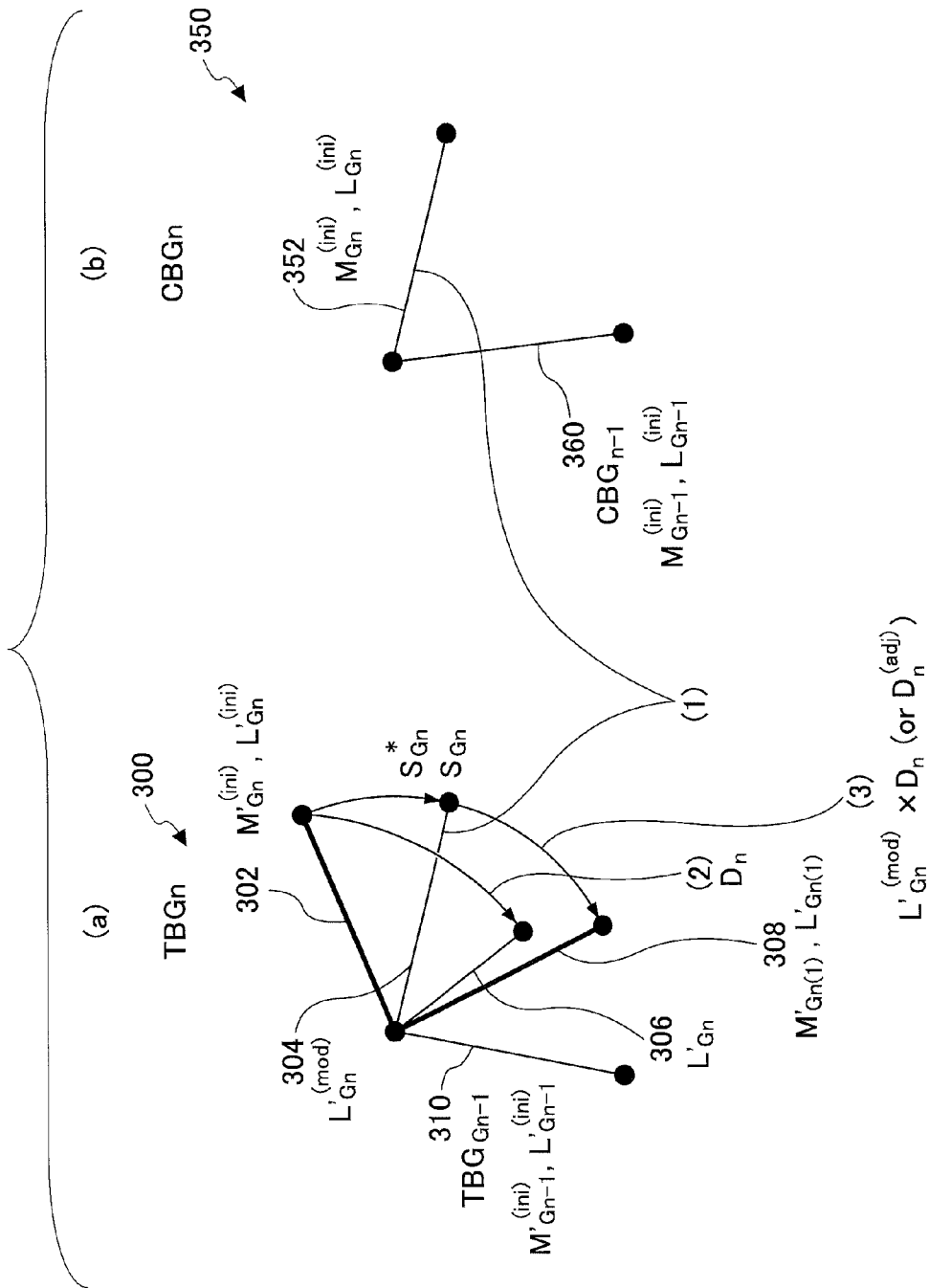
FIG. 16 is a view showing a simple rotation for coinciding axes.

FIG. 16 is a view showing a simple rotation for coinciding axes. In FIG. 16, (a) shows a template bone group $TBG_n$ 300 and (b) shows a character bone group $CBG_n$ 350.

In (a) of FIG. 16, "302" expresses the template bone group $TBG_n$ 300 at the initial state, and "310" expresses the template bone group $TBG_{n-1}$ at the initial state. Similarly, in (b) of FIG. 16, "352" expresses the character bone group $CBG_n$ 300 at the initial state, and "360" expresses the character bone group $CBG_{n-1}$ at the initial state.

In (a) of FIG. 16, a simple rotation is performed on the template bone group $TBG_n$ 300 at the initial state 302 in order to coincide the axis direction of the template bone group $TBG_n$ 300 with that of the character bone group $CBG_n$ 350 at the initial state (1). This process is referred to as a simple rotation for coinciding axes of a bone group $BG_n$.

After having applied the simple rotation for coinciding axes of the bone group $BG_n$, the template bone group $TBG_n$ 300 takes a modified initial state 304. A matrix $L_{Gn}'^{(mod)}$ expressing a direction of the template bone group $TBG_n$ 300 at the modified initial state 304 in the $TBG_{n-1}$ coordinate system is obtained as follows.

Here, a matrix expressing the simple rotation for coinciding axes of the bone group $BG_n$ in the object coordinate system is referred to as $S_{Gn}^*$, and a matrix expressing the simple rotation for coinciding axes of the bone group $BG_n$ in the initial $TBG_n$ coordinate system is referred to as $S_{Gn}$. At this time, $S_{Gn}$ can be expressed as follows.

$$S_{Gn} = M_{Gn}'^{(ini)} S_{Gn}^* M_{Gn}'^{(ini)-1} \quad (203)$$

Further, a direction of the template bone group $TBG_n$ at the modified initial state 304 in the initial $TBG_{n-1}$ coordinate system is referred to as $L_{Gn}'^{(mod)}$. At this time, $L_{Gn}'^{(mod)}$ can be expressed as follows.

$$L_{Gn}'^{(mod)} = S_{Gn} L_{Gn}'^{(ini)} \quad (204)$$

$$= M_{Gn}'^{(ini)} S_{Gn}^* M_{Gn}'^{(ini)-1} L_{Gn}'^{(ini)} \quad (205)$$

$$= M_{Gn}'^{(ini)} S_{Gn}^* M_{Gn-1}'^{(ini)-1} \quad (206)$$

Further, $L_{Gn}'^{(mod)}$ can be obtained as follows as well.

Here, a matrix expressing the simple rotation for coinciding axes of the bone group $BG_n$ in the initial $TBG_{n-1}$ coordinate system is referred to as $S_{Gn-1}$. At this time, $S_{Gn-1}$ can be expressed as follows.

$$SG_{Gn-1} = M_{Gn-1}'^{(ini)} S_{Gn}^* M_{Gn-1}'^{(ini)-1} \quad (207)$$

Then, $L_{Gn'}^{(mod)}$ can be expressed as follows.

$$L_{Gn}'^{(mod)} = L_{Gn}'^{(ini)} S_{Gn-1} \quad (208)$$

$$= L_{Gn}'^{(ini)} M_{Gn-1}'^{(ini)} S_{Gn}^* M_{Gn-1}'^{(ini)-1} \quad (209)$$

$$= M_{Gn}'^{(ini)} S_{Gn}^* M_{Gn-1}'^{(ini)-1} \quad (210)$$

(2.5.2. Calculating Coordinate System Adjusting Matrix)

Then, a matrix for adjusting the difference in the coordinate axes of the template bone group $TBG_n$ 300 at the modified initial state 304 and the character bone group $CBG_n$ 350 at the initial state 352 is obtained. The direction of the template bone group $TBG_n$ 300 at the modified initial state 304 in the object coordinate system is expressed as $L_{Gn}'^{(mod)} M_{Gn-1}'^{(ini)}$, and the direction of the character bone group $CBG_n$ 350 at the initial state 352 in the object coordinate system is expressed as $M_{Gn}^{(ini)}$. A matrix $A_{Gn}$ expressing the conversion between them in the initial modified coordinate system $TBG_n$ is the coordinate system adjusting matrix to be obtained. $A_{Gn}$ can be obtained as follows.

$$A_{Gn} = M_{Gn}^{(ini)} \left( L_{Gn}'^{(mod)} M_{Gn-1}'^{(ini)} \right)^{-1} \quad (211)$$

$$= M_{Gn}^{(ini)} M_{Gn-1}'^{(ini)-1} L_{Gn}'^{(mod)-1} \quad (212)$$

$$= M_{Gn}^{(ini)} M_{Gn-1}'^{(ini)-1} M_{Gn-1}'^{(ini)} S_{Gn}^{*-1} M_{Gn}'^{(ini)-1} \quad (213)$$

$$= M_{Gn}^{(ini)} S_{Gn}^{*-1} M_{Gn}'^{(ini)-1} \quad (214)$$

$A_{Gn}$ can be obtained as follows.

First, the coordinate system adjusting matrix $A_{Gn}^*$ in the object coordinate system is obtained in the next equation.

$$L_{Gn}'^{(mod)} M_{Gn-1}'^{(ini)} A_{Gn}^* = M_{Gn}^{(ini)} \quad (215)$$

Thus, $A_{Gn}^* = M_{Gn-1}'^{(ini)-1} L_{Gn}'^{(mod)-1} M_{Gn}^{(ini)} \quad (216)$ Then, the coordinate system adjusting matrix $A_{Gn}$ is obtained by converting $A_{Gn}^*$ to be expressed in the initial modified coordinate system $TBG_n$.

$$A_{Gn} = \left( L_{Gn}'^{(mod)} M_{Gn-1}'^{(ini)} \right) A_{Gn}^* \left( L_{Gn}'^{(mod)} M_{Gn-1}'^{(ini)} \right)^{-1} \quad (217)$$

$$= L_{Gn}'^{(mod)} M_{Gn-1}'^{(ini)} M_{Gn-1}'^{(ini)-1} L_{Gn}'^{(mod)-1} M_{Gn}^{(ini)} M_{Gn-1}'^{(ini)-1} L_{Gn}'^{(mod)-1} \quad (218)$$

$$= M_{Gn}^{(ini)} M_{Gn-1}'^{(ini)-1} L_{Gn}'^{(mod)-1} \quad (219)$$

$$= M_{Gn}^{(ini)} S_{Gn}^{*-1} M_{Gn}'^{(ini)-1} \quad (220)$$

2.6. Determining Direction of Bone Group

Then, the direction (posture or rotation) of the character bone group $CBG_n$ 350 at a current state 306 is obtained in order to determine the pose of the character from the provided current pose of the template (2).

In this operation, the entirety of the template at the current state is moved such that the direction of the current template bone group $TBG_{n-1}$ coincides the direction of the initial template bone group $TBG_{n-1}$ at the initial state 302, first. Then, under this state, the directions of the template bone group $TBG_n$ and the character bone group $CBG_n$ are compared.

A matrix expressing the rotation of the template bone group $TBG_n$ 300 at the initial state 302 to the current state 306 in the initial $TBG_n$ coordinate system is referred to as $D_n$. $D_n$ can be obtained from the next equation.

$$D_n = L_{Gn}' L_{Gn}'^{(ini)-1} \quad (221)$$

Then, $D_n$ is divided into a bending matrix $D_{Bn}$ and a torsion matrix $D_{Tn}$.

$$D_n = D_{Tn} D_{Bn} \quad (222)$$

For the bending matrix $D_{Bn}$, a scale is multiplied to a bending amount in accordance with a necessity to obtain the matrix $D_{Bn}^{(adj)}$. Then, the adjusted matrix $D_{Bn}^{(adj)}$ is obtained by multiplying $D_{Bn}^{(adj)}$ with $D_{Tn}$. This operation is explained in detail later.

$$D_n^{(adj)} = D_{Tn} D_{Bn}^{(adj)} \quad (223)$$

Then, the direction for the local matrix $L_{Gn(1)}'$ is obtained by multiplying the adjusted matrix $D_n^{(adj)}$ by the template bone group $TBG_n$ at the initial modified state 304 (3).

$$L_{Gn(1)}' = D_n^{(adj)} L_{Gn}'^{(mod)} \quad (224)$$

$$= D_n^{(adj)} M_{Gn}'^{(ini)} S_{Gn}^* M_{Gn-1}'^{(ini)-1} \quad (225)$$

Further, by multiplying $M_{Gn-1}'$ by the direction for the local matrix $L_{Gn(1)}'$, the direction for the character expressed in the object coordinate system is obtained.

$$M_{Gn(1)}' = L_{Gn(1)}' M_{Gn-1}' \quad (226)$$

$$= D_n^{(adj)} M_{Gn}'^{(ini)} S_{Gn}^* M_{Gn-1}'^{(ini)-1} M_{Gn-1}' \quad (227)$$

Subsequently, by multiplying the coordinate system adjusting matrix $A_{Gn}$ to the direction for the matrix $M_{Gn(1)}'$ in order to adjust the differences in the coordinate systems of $TBG_n$ and $CBG_n$, a matrix $M_{Gn}$ for the character bone group $CBG_n$ 350 at the current state is obtained.

$$M_{Gn} = A_{Gn} M_{Gn(1)}' \quad (228)$$

$$= A_{Gn} D_n^{(adj)} M_{Gn}'^{(ini)} S_{Gn}^* M_{Gn-1}'^{(ini)-1} M_{Gn-1}' \quad (229)$$

As "$M_{Gn}'^{(ini)} S_{Gn}^* M_{Gn-1}'^{(ini)-1}$" at the right side is obtained only from the initial pose, it is only necessary to calculate once at first.

If the bending amount is not adjusted, the matrix $M_{Gn}$ becomes as follows.

$$M_{Gn} = A_{Gn} L_{Gn}' L_{Gn}'^{(ini)-1} M_{Gn}'^{(ini)} S_{Gn}^* M_{Gn-1}'^{(ini)-1} M_{Gn-1}' \quad (230)$$

$$= A_{Gn} L_{Gn}' M_{Gn-1}'^{(ini)} S_{Gn}^* M_{Gn-1}'^{(ini)-1} M_{Gn-1}' \quad (231)$$

2.7. Division of $D_n$ into Bending Matrix $D_{Bn}$ and Torsion Matrix $D_{Tn}$, and Adjustment of Bending Amount (2.7.1. Adjustment of Bending Amount)

When copying the pose of the template into the character, there may be a case where a priority is given to relative positional relationships between both ends of the bones (bone groups) rather than the directions of the bones (bone groups). In such a case, an adjustment depending on the lengths of the bones (bone groups) is necessary. For example, when the distance between ends of the character bone group $CBG_n$ is longer than the distance between ends of the template bone group $TBG_n$, and the character bone group $CBG_n$ is also rotated for an angle the same as that of the template bone group $TBG_n$, the relative movement amount of the ends becomes larger for the character bone group $CBG_n$. In order to adjust this difference, it is necessary to reduce just a bending component of the character bone group $CBG_n$ while maintaining the amount of the torsion component among the rotations.

(2.7.2. Division of $D_n$ into Bending Matrix $D_{Bn}$ and Torsion Matrix $D_{Tn}$)

As described above, the matrix expressing the rotation of the template bone group $TBG_n$ 300 at the initial state 302 to the current state 306 in the initial $TBG_n$ coordinate system is referred to as $D_n$. $D_n$ can be determined as the product of the bending matrix $D_{Bn}$ and the torsion matrix $D_{Tn}$ as shown in the next equation.

$$D_n = D_{Tn} D_{Bn} \quad (232)$$

It is assumed that a vector that expresses the $TBG_n$ axis at the current state in the object coordinate system is $v_{Gn}$, and a vector obtained by converting $v_{Gn}$ in the initial $TBG_n$ coordinate system is $v_{Gn(2)}$. The equation for obtaining $v_{Gn(2)}$ from $v_{Gn}$ is as follows.

$$v_{Gn(2)} = v_{Gn} M_{Gn-1}{}' L_{Gn}{}'^{(ini)-1} \quad (233)$$

On the other hand, a vector that expresses the $TBG_n$ axis in the own $TBG_n$ coordinate system is referred to as $v_{Gn}{}^{(self)}$. The above described bending matrix $D_{Bn}$ can be obtained as a simple rotation from $v_{Gn}{}^{(self)}$ to $v_{Gn(2)}$. With this bending matrix $D_{Bn}$, the torsion matrix $D_{Tn}$ can be obtained from the next equation.

$$D_{Tn} = D_n D_{Bn}{}^{-1} \quad (234)$$

(2.7.3. Adjusting Bending Amount and Composing Bending Component and Torsion Component)

Here, a ratio of a distance between ends of the template bone group $TBG_n$ to a distance between ends of the character bone group $CBG_n$ is referred to as $r_n$. A matrix that magnifies $r_n$ to the bending angle of the bending matrix $D_{Bn}$ is referred to as $D_{Bn}{}^{(adj)}$. With this, the bending component and the torsion component can be composed to obtain an adjusted matrix $D_n{}^{(adj)}$ as shown in the next equation.

$$D_n{}^{(adj)} = D_{Tn} D_{Bn}{}^{(adj)} \quad (235)$$

2.8. Determining Direction of Bone in Bone Group

An arrangement of the character bone in the character bone group CBG is obtained from the arrangement of the template bone in the corresponding template bone group TBG (here, the index is omitted).

(2.8.1. Common Coordinate System)

As described above, the TBG coordinate system can be obtained by multiplying a simple rotation from the $TB_1$ axis by the TBG axis, in the $TB_1$ coordinate system. Here, a new "common coordinate system" of a bone $TB_k$ (k=1, 2, ...) (which will be referred to as a "common $TB_k$ coordinate system") is determined as follows.

It is assumed that the common $TB_k$ coordinate system can be obtained by multiplying a simple rotation from the TBG axis to the $TB_k$ axis, from the TBG coordinate system for the template at the initial state. The common $TB_1$ coordinate system becomes the same as the original $TB_1$ coordinate system.

Similar to the template bone, the common coordinate system for the character bone is determined. At this time, an adjustment by the coordinate system adjusting matrix $A_G$ between the bone groups is applied. It is assumed that a common $CB_m$ coordinate system can be obtained by multiplying a simple rotation from the CBG axis to the $CB_m$ axis, of the CBG coordinate system adjusted by $A_G$ for the character at the initial state.

The common bone coordinate system has the following characteristic. The directions of the coordinate systems of the bones are different for each of the bones. Thus, the value of the axis vector unit that expresses the axis of the $TB_k$ in the $TB_k$ coordinate system is different for each of the bones. On the other hand, the value of the axis vector unit that expresses the axis of the $TB_k$ in the common $TB_k$ coordinate system becomes the same for each of the bones in the bone group.

Similarly, when the torsion rotation (rotation around the bone axis) of the bone $TB_k$ is expressed in the $TB_k$ coordinate system, the matrix becomes different for each of the bones. However, when the torsion rotation (rotation around the bone axis) of the bone $TB_k$ is expressed in the common $TB_k$ coordinate system, the matrix becomes the same. These are similar for the character bones. This characteristic can be used when interpolating the directions of bones (posture or rotation).

It is assumed that a matrix expressing the direction of the bone in the common coordinate system in the object coordinate system is $\Omega_j$. Further, it is assumed that a matrix expressing the direction of the bone in the common coordinate system in the bone group coordinate system is $\Lambda_j$. Here, "j" is a number of a bone. In the following, "'" means the template, without "'" means the character. "$^{(ini)}$" means an initial state (initial pose) of a bone.

(2.8.1.1. Common Coordinate System of Template Bone)

A conversion matrix between the original coordinate system of the bone and the common coordinate system is obtained using the initial state of the template.

It is assumed that a vector expressing the TBG axis in the object coordinate system is $v_G{}'^{(ini)}$. It is assumed that a vector expressing the $TB_k$ axis in the object coordinate system is $v_k{}'^{(ini)}$. It is assumed that a simple rotation from $v_G{}'^{(ini)}$ to $V_k{}'^{(ini)}$ is $S_k'$.

It is assumed that a matrix expressing the direction of the common $TB_k$ coordinate system in the object coordinate system is $\Omega_k{}'^{(ini)}$. As the matrix expressing the direction of the TBG in the object coordinate system is $M_G{}'^{(ini)}$, $\Omega_k{}'^{(ini)}$ can be obtained as follows by multiplying $S_k'$ by $M_G{}'^{(ini)}$.

$$\Omega_k{}'^{(ini)} = M_G{}'^{(ini)} S_k' \quad (236)$$

Here, a matrix expressing the direction of the original $TB_k$ coordinate system in the object coordinate system is $M_k{}'^{(ini)}$. Thus, a conversion matrix between $\Omega_k{}'^{(ini)}$ and $M_k{}'^{(ini)}$ is previously obtained. Specifically, a matrix expressing a conversion from $M_k{}'^{(ini)}$ to $\Omega_k{}'^{(ini)}$ in the original $TB_k$ coordinate system is $\Phi_k'$ as is obtained in the next equation.

$$\Phi_k' = \Omega_k{}'^{(ini)} M_k{}'^{(ini)-1} \quad (237)$$
$$= M_G{}'^{(ini)} S_k' M_k{}'^{(ini)-1} \quad (238)$$

It is assumed that a matrix expressing the direction of the common $TB_k$ coordinate system in the TBG coordinate system is $\Lambda_k{}'^{(ini)}$ as is obtained in the next equation.

$$\Lambda_k{}'^{(ini)} = \Omega_k{}'^{(ini)} M_G{}'^{(ini)-1} \quad (239)$$
$$= M_G{}'^{(ini)} S_k' M_G{}'^{(ini)-1} \quad (240)$$

As $\Phi_k'$ and $\Lambda_k{}'^{(ini)}$ are obtained only from the initial pose, these may be obtained once at first.

(2.8.1.2. Common Coordinate System of Character Bone)

A conversion matrix between the original coordinate system of the bone and the common coordinate system is obtained using the initial state of the character.

It is assumed that a vector expressing the CBG axis in the object coordinate system is $v_G^{(ini)}$. It is assumed that a vector expressing the $CB_m$ axis in the object coordinate system is $v_m^{(ini)}$. It is assumed that a simple rotation from $v_G^{(ini)}$ to $v_m^{(ini)}$ is $S_m$.

It is assumed that a matrix expressing the direction of the common $CB_m$ coordinate system in the object coordinate system is $\Omega_m^{(ini)}$. As the matrix expressing the direction of the CBG in the object coordinate system is $M_G^{(ini)}$, $\Omega_m^{(ini)}$ can be obtained as follows by converting $M_G^{(ini)}$ to be expressed in the TBG coordinate system and further multiplying $S_m$ to $M_G^{(ini)}$.

$$\Omega_m^{(ini)} = A_G^{-1} M_G^{(ini)} S_m \tag{241}$$

Here, a matrix expressing the direction of the original $CB_m$ coordinate system in the object coordinate system is $M_m^{(ini)}$. Thus, a conversion matrix between $M_m^{(ini)}$ and $\Omega_m^{(ini)}$ is previously obtained. Specifically, a matrix expressing a conversion from $M_m^{(ini)}$ to $\Omega_m^{(ini)}$ in the original $CB_m$ coordinate system is $\Phi_m$ as is obtained from the next equation.

$$\Phi_m = \Omega_m^{(ini)} M_m^{(ini)-1} \tag{242}$$

$$= A_G^{-1} M_G^{(ini)} S_m M_m^{(ini)-1} \tag{243}$$

It is assumed that a matrix expressing the direction of the common $CB_m$ coordinate system in the CBG coordinate system is $\Lambda_m^{(ini)}$ as is obtained in the next equation.

$$\Lambda_m^{(ini)} = \Omega_m^{(ini)} M_G^{(ini)-1} \tag{244}$$

$$= A_G^{-1} M_G^{(ini)} S_n M_G^{(ini)-1} \tag{245}$$

As $\Phi_m$ and $\Lambda_m^{(ini)}$ are obtained only from the initial pose, these may be obtained once at first.

(2.8.2. Variation in Direction from Initial State)

The current state of the character is determined based on the current state of the template. First, as will be explained later, the direction of the common $TB_k$ coordinate system at the current state is obtained.

It is assumed that a matrix expressing the direction of the common $TB_k$ coordinate system in the object coordinate system is $\Omega_k'$. $\Omega_k'$ can be obtained as follows using the conversion matrix $\Phi_k'$.

$$\Omega_k' = \Phi_k' M_k' \tag{246}$$

It is assumed that a matrix expressing the direction of the common $TB_k$ coordinate system in the TBG coordinate system is $\Lambda_{k'}$ as is obtained in the next equation.

$$\Lambda_k' = \Omega_k' M_G'^{-1} \tag{247}$$

$$= \Phi_k' M_k' M_G'^{-1} \tag{248}$$

A variation of the direction of the $TB_k$ from the initial state is expressed as $U_{k'}$ as follows.

$$U_k' = \Lambda_k' \Lambda_k^{(ini)-1} \tag{249}$$

(2.8.3. Interpolation of Variation Amount in Direction)

Generally, the numbers of bones included in the bone group are different between the template and the character. Further, the lengths of the bones in each of the bone groups may not be the same. Thus, the variation amount $U_k'$ obtained for the template bone cannot be used as it is for the variation amount in direction of the character bone $U_m$.

Thus, the variation amount in direction of the character bone $U_m$ can be obtained by interpolating the variation amount $U_k'$.

Figure 17:
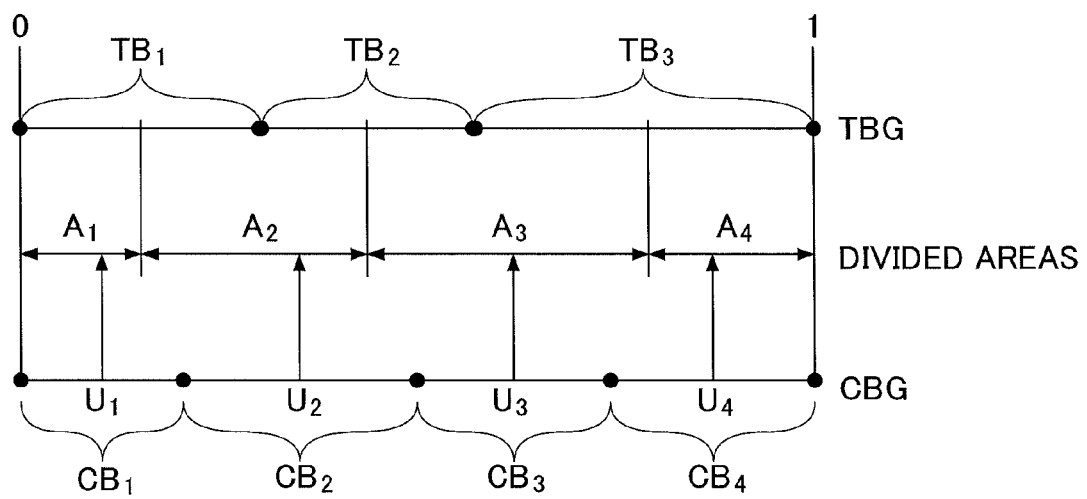
FIG. 17 is a view showing a method of interpolating.

FIG. 17 is a view showing a method of interpolating. FIG. 17 shows a template bone group and a character bone group of a pair (corresponding bone groups). The template bone group TBG includes three bones $TB_1$, $TB_2$ and $TB_3$ and the character bone group CBG includes four bones $CB_1$, $CB_2$, $CB_3$ and $CB_4$.

The bones included in the template bone group TBG and the bones included in the character bone group CBG are shown as lines and multiplied by scales so that the total lengths become 1, respectively. The total length is divided into four areas $A_1$ to $A_4$ at middle points of the bones $TB_1$, $TB_2$ and $TB_3$ of the template bone group TBG.

The variation amount in direction $U_m$ of the character bone $CB_m$ is determined based on the area $A_k$ where the middle point of the character bone $CB_m$ is positioned. For example, when the middle point of the character bone $CB_m$ is positioned at the area $A_k$, the variation amount in direction $U_m$ of the character bone $CB_m$ is obtained by interpolating the variation amounts in direction $U_{k-1}'$ and $U_k'$ (such that the variation amount at the left end of the area $A_k$ becomes $U_{k-1}'$, and the variation amount at the right end of the area $A_k$ becomes $U_k'$). Here, for the area $A_1$, $U_m = U_1'$, and for the area $A_4$, $U_m = U_3'$.

The interpolation may be performed by a known method. The method of interpolating may be as follows.

converting a matrix to a quaternion, performing spherical linear interpolation and converting the result to the matrix again.

interpolating components of a matrix and removing distortion of the matrix using Gram-Schmidt's orthogonalization.

decomposing a matrix into a bending component and a torsion component, interpolating the components respectively, and then composing the results.

Further, when interpolating the torsion rotations for the areas $A_1$ and $A_4$, continuity of the torsion rotations at the boundaries of the bone groups can be actualized by using the torsion rotations of the adjacent bones (bone groups).

(2.8.4. Determining Direction of Character Bone)

The direction of each of the character bones $CB_m$ can be obtained as follows using $U_m$ obtained by the interpolation.

First, a matrix $\Lambda_m$ in which the direction of $CB_m$ in the common coordinate system expressed in the CBG coordinate system is obtained by the next equation.

$$\Lambda_m = U_m \Lambda_m^{(ini)} \tag{250}$$

Then, a matrix $\Omega_m$ in which the direction of $CB_m$ in the common coordinate system is expressed in the object coordinate system is obtained by the next equation.

$$\Omega_m = \Lambda_m M_G \tag{251}$$

$$= U_m \Lambda_m^{(ini)} M_G \tag{252}$$

Finally, a matrix $M_m$ is obtained by converting $CB_m$ in the common coordinate system to the original coordinate system using $\Phi_m$ as follows.

$$M_m = \Phi_m^{-1} \Omega_m \tag{253}$$

$$= \Phi_m^{-1} U_m \Lambda_m^{(ini)} M_G \tag{254}$$

(2.8.5. Correction of Direction of Bone Group)

When determining the direction of bones in the bone group by the above method, the direction of the bone group axis is also changed. Thus, at last, using a simple rotation from the current bone group axis to the previous bone group axis, the entirety of the bone group is rotated to set back the direction of the bone group axis.

2.9. For Bone Having Length "0"

(2.9.1. Length of Bone and Simple Rotation)

For the above method of copying, a simple rotation using a bone axis is frequently used. Thus, if a bone with a length "0" exists, the simple rotation cannot be defined and the operation cannot be processed anymore. Further, even when the bone length is not zero, if the length is extremely short, a problem in calculation may occur. Thus, the minimum allowable value $e_b$ for the bone length is previously determined, and the bone length (the bone axis) is adjusted when the actual bone length is less than the minimum allowable value $e_b$.

For the minimum allowable value $e_b$, the value may be small enough not to cause an influence on an appearance of the pose of the model, and may be large enough to be capable of calculating (0.001 times by a height of a model, for example).

(2.9.2. Adjustment of Bone Axial Vector)

The bone length is adjusted as follows.

In the initial state, the bone lengths are detected by searching the bone groups and the bones from a parent side to a child side, and when a bone $B^{(zero)}$ whose length is less than the minimum allowable value $e_b$ is found, the following operation is performed.

First, the bones in the same bone group are searched toward a child side to find a bone having a length more than or equal to the minimum allowable value $e_b$. The bone found first is assumed as $B^{(len)}$. Then, the axis vector of $B^{(zero)}$ is set to have the minimum allowable value $e_b$ and a direction to be $B^{(len)}$. The coordinate system of the bone is maintained.

FIG. 18 is a view showing an adjustment of an axial vector of a bone.

For example, as shown in (a) of FIG. 18, when the bone length $B_2$ is less than $e_b$, the bone length $B_2$ becomes as shown in (b) by the adjustment.

When a bone having a length more than or equal to $e_b$ cannot be found, a parent bone in the same bone group is used as $B^{(len)}$. When the lengths of all of the bones in the bone group are less than $e_b$, an axis in the parent bone group is used instead of $B^{(len)}$ axis. When a parent bone group does not exist, a previously determined vector is used.

Here, this adjusted bone axis is used only for calculations in determining the pose of the character, and is not used when updating the pose of the character at last. Thus, when updating the pose of the character, only the direction (rotation) of the adjusted bone is used and the bone length is not changed.

2.10. Appendix A: Simple Rotation

Figure 19:
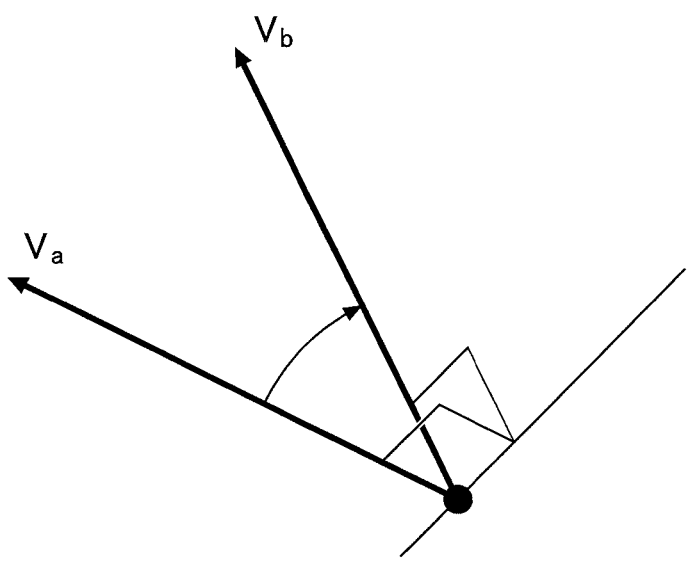
FIG. 19 is a view showing a simple rotation.

FIG. 19 is a view showing a simple rotation.

The "simple rotation" is defined as follows. A simple rotation from $v_a$ to $v_b$ where $v_a$ and $v_b$ are two arbitrary vectors (or line segments with arrows respectively) having a common starting point is defined to comply with the following:

the rotation is around an axis which is perpendicular to a plane formed by $v_a$ and $v_b$ $v_a$ overlaps $v_b$ by the rotation when $v_a$ and $v_b$ are in the same direction ($v_a = kv_b$, $k>0$), no rotation is performed (expressed by a unit matrix as the rotation matrix)

when $v_a$ and $v_b$ are opposite ($v_a = kv_b$, $k<0$), it is impossible to define.

The pose or movement of a skeleton model to be controlled can be controlled with a simple method. The individual constituents of the model control system 800 may be embodied by arbitrary combinations of hardware and software, typified by a CPU of an arbitrary computer, memory, a program loaded in the memory so as to embody the constituents illustrated in the drawings, storage units for storing the program such as a hard disk, and an interface for network connection. It may be understood by those skilled in the art that methods and devices for the embodiment allow various modifications.

Although a preferred embodiment of the method of controlling model has been specifically illustrated and described, it is to be understood that minor modifications may be made therein without departing from the spirit and scope of the invention as defined by the claims.

The present invention is not limited to the specifically disclosed embodiments, and variation and modifications may be made without departing from the scope of the present invention.

The present application is based on Japanese Priority Application No. 2011-266383 filed on Dec. 6, 2011, the entire contents of which are hereby incorporated by reference.

What is claimed is:

1. A method of controlling a target skeleton model including a plurality of bones that are connected by joints, by a computer, comprising:

displaying an image of the target skeleton model on a screen for an operator;

accepting an instruction of changing a pose or a movement of the target skeleton model displayed on the screen from the operator via an interface;

applying the instruction of changing the pose or the movement of the target skeleton model to a standard skeleton model including a plurality of bones that are connected by joints, control data for joint angles to apply a limitation to a pose or a movement of the standard skeleton model being attached to the standard skeleton model, the number of bones of the standard skeleton being different from the number of bones of the target skeleton model, the plurality of bones of the standard skeleton model being classified into a plurality of bone groups of the standard skeleton model, and the plurality of bones of the target skeleton model being classified into a plurality of bone groups of the target skeleton model such that the plurality of bone groups of the standard skeleton model being in correspondence with the plurality of bone groups of the target skeleton model, respectively, in one-to-one relationship, for at least one of the bone groups of the standard skeleton model, the number of the bones included in the respective bone group of the standard skeleton model being different from the number of the bones included in the corresponding bone group of the target skeleton model that is in correspondence with the bone group of the standard skeleton model, and the instruction of changing the pose or the movement of the target skeleton model being converted to an instruction of changing the pose or the movement of the standard skeleton model based on the correspondence of the bone groups of the standard skeleton model and the bone groups of the target skeleton model;

determining a pose or a movement of the standard skeleton model based on the instruction and the control data for joint angles attached to the standard skeleton model; and determining a pose or a movement of the target skeleton model such that the pose or the movement of the target skeleton model follows the pose or the movement of the determined standard skeleton model based on the correspondence of the bone groups of the standard skeleton model and the bone groups of the target skeleton model, respectively, wherein the determining the pose or the movement of the target skeleton model includes specifying one of the bone groups of the standard skeleton model and a corresponding one of the bone groups of the target skeleton model based on the correspondence of the bone groups of the standard skeleton model and the bone groups of the target skeleton model, copying a direction of the specified bone group of the standard skeleton model into the specified bone group of the target skeleton model, and copying a direction of each of the bones included in the specified bone group of the standard skeleton model into the corresponding bones included in the specified bone group of the target skeleton model.

2. The method of controlling the target skeleton model according to claim 1, wherein the control data for joint angles includes a setting of an angle limitation or a hardness in bending for each of the joints of the standard skeleton model.

3. The method of controlling the target skeleton model according to claim 1, wherein the pose or the movement of the target skeleton model is determined based on the relationship between the pose or the movement of the standard skeleton model at an initial state and the pose or the movement of the target skeleton model at an initial state.

4. The method of controlling the target skeleton model according to claim 1, wherein when the bone group includes a plurality of bones, the angle of each of joints connecting the plurality of bones is determined based on the angles of joints at a starting point and an end point.

5. The method of controlling the target skeleton model according to claim 1, wherein the correspondence of the bone groups of the standard skeleton model and the bone groups of the target skeleton model is obtained by comparing structures of the standard skeleton model and the target skeleton model or as instructed by an operator.

6. The method of controlling the target skeleton model according to claim 1, wherein the correspondence of the bone groups of the standard skeleton model and the bone groups of the target skeleton model is obtained by pattern recognition.

7. A non-transitory computer-readable recording medium having recorded thereon a program that causes a computer to execute the method of claim 1.

8. The method of controlling the target skeleton model according to claim 1, wherein in the determining the pose or the movement of the target skeleton model, determining the pose or the movement of each of the bone groups of the target skeleton model to follow the corresponding bone group of the standard skeleton model such that the pose or the movement of the target skeleton model follows the pose or the movement of the determined standard skeleton model based on the correspondence of the bone groups of the standard skeleton model and the bone groups of the target skeleton model, respectively.

9. The method of controlling the target skeleton model according to claim 1, wherein the target skeleton model is a new generated skeleton model and the standard skeleton model is a previously prepared skeleton model provided for applying a limitation to the pose or the movement of the target skeleton model based on the control data for join angles.

10. The method of controlling the target skeleton model according to claim 1, wherein control data for joint angles is not attached to the target skeleton model.

11. The method of controlling the target skeleton model according to claim 1, wherein after performing the determining the pose or the movement of the standard skeleton model and the determining the pose or the movement of the target skeleton model, a new pose or movement of the target skeleton model is displayed on the screen for the operator.

12. The method of controlling the target skeleton model according to claim 1, wherein each of the bone groups is an assembly of linearly connected one or more bones.

13. A method of controlling a target skeleton model including a plurality of bones, comprising:

using a standard skeleton model including another plurality of bones the number of which is different from the number of the bones of the target skeleton model, classifying the plurality of bones of the standard skeleton model into a plurality of bone groups of the standard skeleton model, and classifying the plurality of bones of the target skeleton model into a plurality of bone groups of the target skeleton model such that the plurality of bone groups of the standard skeleton model become in correspondence with the plurality of bone groups of the target skeleton model, respectively, in one-to-one relationship, for at least one of the bone groups of the standard skeleton model, the number of the bones included in the respective bone group of the standard skeleton model being different from the number of the bones included in the corresponding bone group of the target skeleton model that is in correspondence with the bone group of the standard skeleton model;

determining a pose or a movement of the standard skeleton model based on an instruction;

determining a pose or a movement of the target skeleton model such that the pose or the movement of the target skeleton model follows the pose or the movement of the determined standard skeleton model by
- specifying one of the bone groups of the standard skeleton model and a corresponding one of bone groups of the target skeleton model based on the correspondence of the bone groups of the standard skeleton model and the bone groups of the target skeleton model and the pose or the movement of the standard skeleton model,
- copying a direction of the specified bone group of the standard skeleton model into the specified bone group of the target skeleton model such as to follow the direction of the specified bone group of the standard skeleton model, and
- copying a direction of each of the bones included in the specified bone group of the standard skeleton model into the corresponding bones included in the specified bone group of the target skeleton model.

14. A non-transitory computer-readable recording medium having recorded thereon a program that causes a computer to execute the method of claim 13.

15. The method of controlling the target skeleton model according to claim 13,
wherein the target skeleton model is a new generated skeleton model and the standard skeleton model is a previously prepared skeleton model having a function to apply a limitation to the pose or the movement of the target skeleton model.

16. The method of controlling the target skeleton model according to claim 13,
wherein the bones of the standard skeleton model are connected by joints and the bones of the target skeleton model are connected by joints, and
wherein control data for joint angles is attached to the standard skeleton model and control data for joint angles is not attached to the target skeleton model.

17. The method of controlling the target skeleton model according to claim 16, further comprising:
displaying an image of the target skeleton model on a screen for an operator;
accepting an instruction of changing a pose or a movement of the target skeleton model by the operator via an interface;
converting the instruction of changing the pose or the movement of the target skeleton model to an instruction of changing a pose or a movement of the standard skeleton model based on the correspondence of the bone groups of the target skeleton model and the bone groups of the standard skeleton model, respectively; and
determining a pose or a movement of the standard skeleton model based on the converted instruction and the control data for joint angles attached to the standard skeleton model,
wherein after performing the determining the direction of each of the bones included in the specified group of bones of the target skeleton model, a new pose or movement of the target skeleton model is displayed on the screen for the operator.

18. The method of controlling the target skeleton model according to claim 13,
wherein each of the bone groups is an assembly of linearly connected one or more bones.

* * * * *